(12) United States Patent
Lee et al.

(10) Patent No.: US 11,718,723 B2
(45) Date of Patent: Aug. 8, 2023

(54) CROSSLINKED POLYOLEFIN SEPARATOR AND MANUFACTURING METHOD THEREFOR

(71) Applicant: LG Chem, Ltd., Seoul (KR)

(72) Inventors: Joo-Sung Lee, Daejeon (KR); Bi-Oh Ryu, Daejeon (KR); Won-Sik Bae, Daejeon (KR); A-Young Lee, Daejeon (KR); Heon-Sik Song, Daejeon (KR)

(73) Assignee: LG Chem, Ltd.

( * ) Notice: Subject to any disclaimer, the term of this patent is extended or adjusted under 35 U.S.C. 154(b) by 576 days.

(21) Appl. No.: 16/648,562

(22) PCT Filed: Jul. 26, 2019

(86) PCT No.: PCT/KR2019/009361
§ 371 (c)(1),
(2) Date: Mar. 18, 2020

(87) PCT Pub. No.: WO2020/022848
PCT Pub. Date: Jan. 30, 2020

(65) Prior Publication Data
US 2020/0220139 A1 Jul. 9, 2020

(30) Foreign Application Priority Data

Jul. 26, 2018 (KR) .................. 10-2018-0087450
Jul. 26, 2018 (KR) .................. 10-2018-0087451
Sep. 11, 2018 (KR) .................. 10-2018-0108560

(51) Int. Cl.
H01M 50/00 (2021.01)
C08J 7/16 (2006.01)
(Continued)

(52) U.S. Cl.
CPC ............. C08J 7/16 (2013.01); H01M 50/403 (2021.01); H01M 50/406 (2021.01);
(Continued)

(58) Field of Classification Search
CPC ... H01M 50/406; H01M 50/417; Y02E 60/10; B29C 48/00; C08J 7/16
See application file for complete search history.

(56) References Cited

U.S. PATENT DOCUMENTS

| 5,741,858 A | 4/1998 | Brann et al. |
| 2003/0031924 A1* | 2/2003 | Lee ................. H01M 50/411 |
| | | 429/142 |

(Continued)

FOREIGN PATENT DOCUMENTS

| CN | 102888016 A | 1/2013 |
| CN | 103441229 A | 12/2013 |

(Continued)

OTHER PUBLICATIONS

Search Report dated Dec. 7, 2021 from Office Action for Chinese Application No. 201980004620.3 dated Dec. 16, 2021. 3 pgs.

(Continued)

Primary Examiner — Cynthia H Kelly
Assistant Examiner — Monique M Wills
(74) Attorney, Agent, or Firm — Lerner David LLP

(57) ABSTRACT

A crosslinked polyolefin separator which has gels with a longer side length of 50 μm or more in a number ranging from 0 to 3 per 1 m² of the separator, and shows a standard deviation of absorbance ratio between the center of the separator and the side thereof ranging from 0.01 to 0.5 is provided. A method for manufacturing the crosslinked polyolefin separator is also provided. The method includes (S1) preparing a polyolefin porous membranes, and (S2) applying a coating solution containing an initiator and alkoxy group-containing vinylsilane onto at least one surface of the porous membrane. The coating solution can permeate even to the inside of exposed pores. Thus, it is possible to provide a (Continued)

crosslinked polyolefin separator in which silane crosslinking occurs uniformly even inside of the pores.

5 Claims, 13 Drawing Sheets

(51) Int. Cl.
  *H01M 50/403* (2021.01)
  *H01M 50/417* (2021.01)
  *H01M 50/489* (2021.01)
  *H01M 50/406* (2021.01)

(52) U.S. Cl.
  CPC ....... *H01M 50/417* (2021.01); *H01M 50/489* (2021.01); *C08J 2323/06* (2013.01)

(56) References Cited

U.S. PATENT DOCUMENTS

| | | |
|---|---|---|
| 2005/0277702 A1 | 12/2005 | Lee et al. |
| 2010/0136393 A1 | 6/2010 | Takezawa et al. |
| 2010/0136410 A1 | 6/2010 | Kawasoe et al. |
| 2011/0081601 A1 | 4/2011 | Weber et al. |
| 2011/0229768 A1 | 9/2011 | Pan et al. |
| 2012/0177976 A1 | 7/2012 | Wensley et al. |
| 2012/0301698 A1 | 11/2012 | Rhee et al. |
| 2014/0295245 A1 | 10/2014 | Miyazaki |
| 2015/0163926 A1 | 6/2015 | Huang |
| 2016/0006011 A1 | 1/2016 | Chen |
| 2016/0126518 A1* | 5/2016 | Park ................. B29C 48/0018 521/143 |
| 2016/0190532 A1 | 6/2016 | Zhao et al. |
| 2016/0372728 A1 | 12/2016 | Yoshimaru et al. |
| 2018/0162109 A1 | 6/2018 | Gopalan et al. |
| 2020/0188861 A1 | 6/2020 | Hamada et al. |

FOREIGN PATENT DOCUMENTS

| | | |
|---|---|---|
| CN | 105576172 A | 5/2016 |
| CN | 106920912 A | 7/2017 |
| JP | H11172036 A | 6/1999 |
| JP | 2001296243 A | 10/2001 |
| JP | 2011208144 A | 10/2011 |
| JP | 2012510543 A | 5/2012 |
| JP | 2013517969 A | 5/2013 |
| JP | 2015072266 A | 4/2015 |
| JP | 2015115602 A | 6/2015 |
| JP | 2017188392 A | 10/2017 |
| KR | 20090079943 A | 7/2009 |
| KR | 20090129495 A | 12/2009 |
| KR | 20100119888 A | 11/2010 |
| KR | 20140015190 A | 2/2014 |
| KR | 20140118818 A | 10/2014 |
| KR | 20150025825 A | 3/2015 |
| KR | 20160003304 A | 1/2016 |
| KR | 20160038454 A | 4/2016 |
| KR | 20160038918 A | 4/2016 |
| KR | 20160048420 A | 5/2016 |
| KR | 20160052332 A | 5/2016 |
| KR | 20160097958 A | 8/2016 |
| KR | 20160129538 A | 11/2016 |
| KR | 20160146134 A | 12/2016 |
| KR | 20170087315 A | 7/2017 |
| KR | 20170113692 A | 10/2017 |
| KR | 20180024101 A | 3/2018 |
| KR | 20180033487 A | 4/2018 |
| WO | 2018003943 A1 | 1/2018 |

OTHER PUBLICATIONS

European Search Report for Application No. 19842259.4, dated Dec. 10, 2020, 10 pages.

Xiaoming Zhu et al: "A Highly Thermostable Ceramic-Grafted Microporous Polyethylene Separator for Safer Lithium-Ion Batteries", ACS Applied Materials & Interfaces, vol. 7, No. 43, Nov. 4, 2015 (Nov. 4, 2015), pp. 24119-24126, XP055694572.

International Search Report for Application No. PCT/KR2019/009361 dated Nov. 29, 2019, 2 pages.

* cited by examiner

CROSSLINKED POLYOLEFIN SEPARATOR AND MANUFACTURING METHOD THEREFOR

TECHNICAL FIELD

The present disclosure relates to a crosslinked polyolefin separator and a method for manufacturing the same.

CROSS-REFERENCE TO RELATED APPLICATION

The present application is a national phase entry under 35 U.S.C. § 371 of International Application No PCT/KR2019/009361 filed Jul. 26, 2019 which claims priority from Korean Patent Application No. 10-2018-0087451 filed on Jul. 26, 2018, Korean Patent Application No. 10-2018-0087450 filed on Jul. 26, 2018 and Korean Patent Application No. 10-2018-0108560 filed on Sep. 11, 2018 in the Republic of Korea, the disclosures of which including the specification and drawings are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Such a lithium secondary battery includes a positive electrode, a negative electrode, an electrolyte and a separator. Particularly, it is required for the separator to have insulation property for separating the positive electrode and the negative electrode from each other and high ion conductivity for increasing lithium ion permeability based on high porosity.

Particularly, a silane crosslinked porous membrane having a high melt-down temperature has been used as such a separator.

Meanwhile, the conventional silane crosslinked polyolefin porous membrane is obtained by carrying out silane grafting during the extrusion of a polyolefin composition so that silane grafting and extrusion of a polyolefin composition may be performed at the same time. However, the above process requires a step of extracting a diluting agent after the reactive extrusion step, and thus a crosslinking agent, initiator, or the like, are removed together with the diluting agent, thereby making it difficult to control the crosslinking. Moreover, there is a problem in that a deviation of thickness in the width direction is generated in the resultant separator.

In addition, since polyolefin, diluting agent, crosslinking agent, or the like, are introduced to an extruder at once to carry out reaction, side reactions may occur in the extruder, thereby causing a problem of increased gel formation. Therefore, there is a need for solving the above-mentioned problems.

In addition, during the extraction of diluting agent, crosslinking agent, or the like, is removed together with the diluting agent, thereby making it difficult to control the crosslinking.

DISCLOSURE

Technical Problem

The present disclosure is designed to solve the problems of the related art, and therefore the present disclosure is directed to providing a crosslinked polyolefin separator which shows a low amount of gel formation during extrusion, and a method for manufacturing the same.

The present disclosure is also directed to providing a separator which shows a small deviation of thickness in the width direction, and a method for manufacturing the same.

In addition, the present disclosure is directed to providing a separator in which silane crosslinking is performed uniformly into pores, and a method for manufacturing the same.

Technical Solution

In one aspect of the present disclosure, there is provided a crosslinked polyolefin separator according to any one of the following embodiments.

According to the first embodiment of the present disclosure, there is provided a crosslinked polyolefin separator which includes silane-crosslinked polyolefin, has gels with a longer side length of 50 m or more in a number ranging from 0 to 3 per 1 $m^2$ of the separator, and shows a standard deviation of absorbance ratio between the center of the separator and the side thereof ranging from 0.01 to 0.5, wherein the absorbance ratio is determined by $I_{1090}/I_{2920}$ (×1000), $I_{1090}$ means the absorbance at 1090 $cm^{-1}$ where the functional group of —Si—$OCH_3$ derived from crosslinking is detected, and $I_{2920}$ means the absorbance at 2920 $cm^{-1}$ where the characteristic peak of polyolefin before crosslinking is expressed.

According to the second embodiment of the present disclosure, there is provided the crosslinked polyolefin separator as defined in the first embodiment, wherein the standard deviation of absorbance ratio between the center of the separator and the side thereof is 0.25-0.40.

According to third embodiment of the present disclosure, there is provided the crosslinked polyolefin separator as defined in the first or the second embodiment, which has a process capability index (Cp) of 1.3 or more, wherein the silane (Si) content in the separator is 700 ppm or more based on 100 parts by weight of the separator.

According to the fourth embodiment of the present disclosure, there is provided the crosslinked polyolefin separator as defined in any one of the first to the third embodiments, which satisfies the following [Formula 1] and [Formula 2] in a nail penetration test wherein a nail having a temperature of 250° C. or higher is dropped vertically:

$b/a \leq 3.0$ [Formula 1]

$c/(b-a) \geq 0.75$ [Formula 2]

wherein a represents a diameter of nail used in the nail penetration test, b represents a diameter of separator lost after nail penetration in the nail penetration test, and c represents a length of pore-blocked region after nail penetration.

According to the fifth embodiment of the present disclosure, there is provided the crosslinked polyolefin separator as defined in any one of the first to the fourth embodiments, wherein b/a is 1.0-2.5, and c/(b−a) is 1.0 or more.

In another aspect of the present disclosure, there is also provided a method for manufacturing a crosslinked polyolefin separator according to any one of the following embodiments.

According to the sixth embodiment of the present disclosure, there is provided a method for manufacturing a crosslinked polyolefin separator, including the steps of:

(S1) preparing a polyolefin porous membrane;

(S2) applying a coating solution containing an initiator and alkoxy group-containing vinylsilane onto at least one surface of the porous membrane;

(S3) drying and thermally fixing the porous membrane coated with the coating solution; and (S4) crosslinking the thermally fixed porous membrane in the presence of water.

According to the seventh embodiment of the present disclosure, there is provided the method for manufacturing a crosslinked polyolefin separator as defined in the sixth embodiment, wherein step (S1) includes the following steps of:

introducing polyolefin and a diluting agent to an extruder, followed by mixing, and carrying out extrusion to prepare a polyolefin composition;

molding and orienting the extruded polyolefin composition in the form of a sheet; and extracting the diluting agent from the oriented sheet to obtain a porous membrane.

According to the eighth embodiment of the present disclosure, there is provided the method for manufacturing a crosslinked polyolefin separator as defined in the sixth or the seventh embodiment, wherein silane grafting occurs simultaneously in the porous membrane, in thermal fixing step (S3).

According to the ninth embodiment of the present disclosure, there is provided the method for manufacturing a crosslinked polyolefin separator as defined in any one of the sixth to the eighth embodiments, wherein the alkoxy group-containing vinylsilane includes trimethoxyvinylsilane, triethoxyvinylsilane, triacetoxyvinylsilane, or a mixture of two or more of them.

According to the tenth embodiment of the present disclosure, there is provided the method for manufacturing a crosslinked polyolefin separator as defined in any one of the sixth to the ninth embodiments, wherein the thermal fixing is carried out at a temperature of 110-145° C.

According to the eleventh embodiment of the present disclosure, there is provided the method for manufacturing a crosslinked polyolefin separator as defined in any one of the sixth to the tenth embodiments, wherein the thermal fixing is carried out at a temperature of 110-145° C., and the alkoxy group-containing vinylsilane includes two types of alkoxy group-containing vinylsilane having a different boiling point.

According to the twelfth embodiment of the present disclosure, there is provided the method for manufacturing a crosslinked polyolefin separator as defined in any one of the sixth to the eleventh embodiments, wherein the alkoxy group-containing vinylsilane is a mixture of trimethoxyvinylsilane with triethoxyvinylsilane, and the weight ratio of the trimethoxyvinylsilane to triethoxyvinylsilane is 90:10-30:70.

According to the thirteenth embodiment of the present disclosure, there is provided the method for manufacturing a crosslinked polyolefin separator as defined in any one of the sixth to the twelfth embodiments, wherein the thermal fixing is carried out at a temperature of 110-145° C., the alkoxy group-containing vinylsilane is a mixture of trimethoxyvinylsilane with triethoxyvinylsilane, and the weight ratio of the trimethoxyvinylsilane to triethoxyvinylsilane is 90:10-30:70.

According to the fourteenth embodiment of the present disclosure, there is provided the method for manufacturing a crosslinked polyolefin separator as defined in any one of the sixth to the thirteenth embodiments, wherein the thermal fixing step is started at a temperature lower than the boiling point of the alkoxy group-containing vinylsilane and is completed at a temperature higher than the boiling point of the alkoxy group-containing vinylsilane.

According to the fifteenth embodiment of the present disclosure, there is provided the method for manufacturing a crosslinked polyolefin separator as defined in any one of the sixth to the fourteenth embodiments, wherein the coating solution further includes a crosslinking catalyst.

According to the sixteenth embodiment of the present disclosure, there is provided the method for manufacturing a crosslinked polyolefin separator as defined in the fifteenth embodiment, wherein the crosslinking catalyst includes dibutyltin dilaurate, dibutyltin diacetate, stannous acetate, stannous caprylate, zinc naphthenate, zinc caprylate, cobalt naphthenate, ethylamine, dibutylamine, hexylamine, pyridine, sulfuric acid, hydrochloric acid, toluene, sulfonic acid, acetic acid, stearic acid, maleic acid, or a mixture of two or more of them.

According to the seventeenth embodiment of the present disclosure, there is provided the method for manufacturing a crosslinked polyolefin separator as defined in any one of the sixth to the sixteenth embodiments, which further includes a step of removing the coating solution between step (S2) and step (S3).

According to the eighteenth embodiment of the present disclosure, there is provided the method for manufacturing a crosslinked polyolefin separator as defined in any one of the sixth to the seventeenth embodiments, wherein the step of removing the coating solution is carried out by removing the surplus coating solution by pressurizing the porous membrane coated with the coating solution.

According to the nineteenth embodiment of the present disclosure, there is provided the method for manufacturing a crosslinked polyolefin separator as defined in any one of the sixth to the eighteenth embodiments, wherein the pressurization is controlled to a linear pressure of 0.1-100 kgf/cm.

According to the twentieth embodiment of the present disclosure, there is provided the method for manufacturing a crosslinked polyolefin separator as defined in any one of the sixth to the nineteenth embodiments, wherein the step of removing the coating solution is carried out by passing the porous membrane through a gap between a first roller and a second roller facing each other to remove the surplus coating solution.

According to the twenty first embodiment of the present disclosure, there is provided the method for manufacturing a crosslinked polyolefin separator as defined in the twentieth embodiment, wherein the gap between the first roller and the second roller is +10 µm to −10 µm, and the gap, S, is defined by the formula of $S=D-(R_1+R_2+T)$, wherein D represents a distance between the first roller center and the second roller center, $R_1$ represents the first roller radius, $R_2$ represents the second roller radius, and T represents the thickness of the polyolefin porous membrane.

According to the twenty second embodiment of the present disclosure, there is provided the method for manufacturing a crosslinked polyolefin separator as defined in the seventeenth embodiment, which further includes a rubbing step of absorbing the surplus coating solution between the step of removing the coating solution and thermal fixing step (S3).

According to the twenty third embodiment of the present disclosure, there is provided the method for manufacturing a crosslinked polyolefin separator as defined in the twenty second embodiment, wherein the rubbing step is carried out by using a rubbing roller or rubbing cloth.

According to the twenty fourth embodiment of the present disclosure, there is provided the method for manufacturing a crosslinked polyolefin separator as defined in the twenty third embodiment, wherein the rubbing roller or rubbing cloth includes a non-woven web, cotton, paper, liquid-absorbing sheet, or at least two absorption members of them.

Advantageous Effects

In the method for manufacturing g a crosslinked polyolefin separator according to the present disclosure, a polyolefin composition containing polyolefin with a diluting agent is introduced to an extruder and mixed therein to prepare polyolefin composition. Then, the diluting agent is extracted from the composition to obtain a porous membrane, and a coating solution containing an initiator and alkoxy group-containing vinylsilane is applied thereto.

In other words, the coating solution can permeate even into the pores exposed from the porous membrane, and thus silane crosslinking is carried out uniformly even inside of the pores. As a result, it is possible to provide a crosslinked polyolefin separator having the same or a similar level of absorbance ratio over the whole separator.

Therefore, it is possible to provide a crosslinked polyolefin separator in which silane crosslinking is carried out on the fibril surface present inside of the pores.

According to an embodiment of the present disclosure, it is possible to provide a crosslinked polyolefin separator having a uniform crosslinking degree over the whole separator surface. In addition, gel is less formed in the separator. Thus, it is possible to improve the mechanical strength, such as tensile strength, of the separator. It is also possible to provide a separator capable of transporting lithium salt uniformly.

BEST MODE

Figure 1:
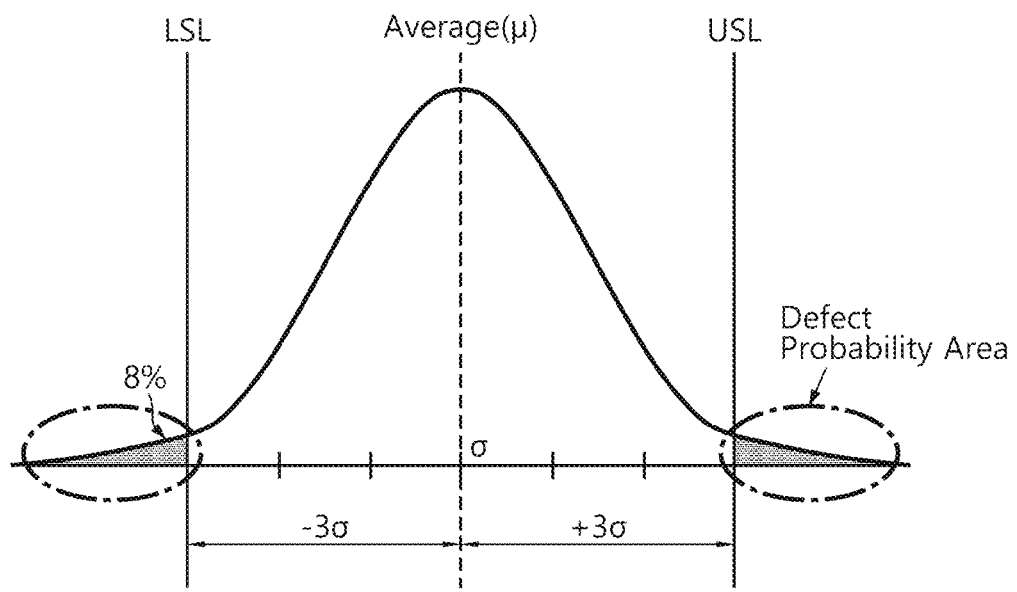
FIG. 1 is a schematic view illustrating a process capability index.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect, there are provided a method for manufacturing a crosslinked polyolefin separator, and a crosslinked polyolefin separator.

A separator for use in a lithium secondary battery shows excellent safety, when it shows a broad interval between the shut-down temperature and the melt-down temperature. To broaden the interval between a shut-down temperature and a melt-down temperature, it is required that the shut-down temperature is controlled to be decreased and the melt-down temperature is controlled to be increased.

Therefore, according to the present disclosure, a silane-crosslinked polyolefin porous membrane is used to obtain a separator having a higher melt-down temperature.

However, when manufacturing a silane-crosslinked polyolefin porous membrane, polyolefin, a diluting agent, initiator and alkoxy group-containing vinylsilane are introduced to an extruder at once. Thus, it is difficult to control the orientation ratio to a high ratio due to the mechanical properties of sheets changed by reactive extrusion. In addition, when silane grafting is also performed during the extrusion of a polyolefin composition, unreacted crosslinking additives (alkoxy group-containing vinylsilane, initiator, crosslinking catalyst) are removed together with the diluting agent in the step of removing the diluting agent. Thus, it is difficult to control the crosslinking uniformly. As a result, there is a problem in that uniform crosslinking is accomplished in a partial region of the separator but crosslinking is not accomplished suitably in the other regions. In addition, a deviation of thickness is generated in the width direction of the resultant separator, or a large amount of gel formation occurs during the extrusion.

To solve the above-mentioned problems, there are provided a crosslinked polyolefin separator and a method for manufacturing the same according to the present disclosure.

According to the present disclosure, there is provided a crosslinked polyolefin separator which shows a uniform crosslinking degree over the whole separator surface. The crosslinked polyolefin separator has gels with a longer side length of 50 μm or more in a number ranging from 0 to 10 per 1 m² of the separator, and shows a standard deviation of absorbance ratio between the center of the separator and the side thereof ranging from 0.01 to 0.50, or from 0.02 to 0.45, or from 0.25 to 0.40. Herein, the absorbance ratio is determined by the ratio of the absorbance at 1090 cm$^{-1}$ where the functional group of —Si—OCH$_3$ derived from crosslinking is detected based on the absorbance at 2920 cm$^{-1}$ where the characteristic peak of polyolefin before crosslinking is expressed, i.e. $I_{1090}/I_{2920}$ (×1000).

The crosslinked polyolefin separator according to the present disclosure has gels (foreign materials) with a longer side length of 50 m or more in a number ranging from 0 to 3, from 0 to 2, from 0 to 1, or 0, per 1 m² of the separator. When gels are formed in the separator, mechanical strength, such as tensile strength, of the separator is deteriorated and uniform transport of lithium salt is degraded undesirably.

As used herein, 'center' means the width-direction centerline of the crosslinked polyolefin separator. Since the crosslinked polyolefin separator is manufactured through the processing line in the longitudinal direction of the separator, and the crosslinked polyolefin porous membrane has a predetermined width when the coating solution is applied to at least one surface thereof, the centerline of the crosslinked polyolefin porous membrane may be sagged so that the coating solution may be present in a larger amount at the centerline of the crosslinked porous membrane. As a result, according to the related art, crosslinking tends to be formed more highly at the centerline of the crosslinked polyolefin porous membrane in the width direction thereof.

As used herein, 'separator side' means the width-direction sideline of the crosslinked polyolefin separator.

According to an embodiment of the present disclosure, the crosslinked polyolefin separator may have a crosslinking degree of 20-60%. When the crosslinked polyolefin separator has a crosslinking degree within the above-defined range, it may be provided with preferred mechanical strength and heat resistance in terms of application as a separator. Herein, the crosslinking degree is a ratio obtained by weighing the initial weight of a separator, dipping the separator in decalin solution at 135° C. and boiling it therein for 4 hours according to ASTM D 2765, weighing the dry weight of residue, and calculating the ratio of the dry weight of residue based on the initial weight.

According to an embodiment of the present disclosure, the crosslinked polyolefin separator has a process capability index (Cp) of 1.3 or more, and the silane (S1) content in the separator may be 700 ppm or more based on 100 parts by weight of the separator.

Thus, there is provided a separator for an electrochemical device which has process capability in the width direction corresponding to a process capability index (Cp) of 1.3 or more, or 1.5 or more, and includes gels with a longer side length of 50 m or more in a number of 3 or less, or 1 or less, per 1 m² of the separator.

As used herein, 'process capability index' is a measure indicating how much the production process is controlled while reducing a change in process characteristics. Particularly, it means a short-term process capability index for a period of several days or several weeks. A higher process capability index suggests a smaller change in process characteristics, and thus higher process uniformity.

According to the present disclosure, the process capability index may be determined by the following formula, but is not limited thereto:

Process capability index=(Upper specification limit−Lower specification limit)/(6×Standard deviation)

Herein, the standard deviation is calculated considering only the variation within subgroups.

The upper specification limit (USL), lower specification limit (LSL) and the standard deviation are shown in FIG. 1.

According to an embodiment of the present disclosure, the silane (S1) content in the separator may be 700 ppm or more, 900 ppm or more, or 1100 ppm or more, based on 100 parts by weight of the separator. In addition, the silane content in the separator may be 2500 ppm or less based on 100 parts by weight of the separator. Within the above-defined range, it is possible to accomplish desired mechanical properties and thermal properties. In addition, it is possible for the separator to maintain a resistance value suitable for application as a separator for an electrochemical device by virtue of an adequate amount of silane crosslinking.

The silane content in the separator may be determined by the following method, but is not limited thereto. For example, the silane content in the separator may be determined by using an inductively coupled plasma with mass spectrometer (ICP-MS), such as Axiom model, wherein MC-ICP-MS, Axiom is AXIOM MC model available from Thermo Elemental Ltd (GB) provided with high resolution.

Meanwhile, innovative improvement is required in terms of safety in order to apply a lithium secondary battery to middle- or large-scale devices, such as electric vehicles. The safety should be considered from thermal, electrical and mechanical points of view. In the case of a lithium secondary battery used for middle- or large-scale devices, such as electric vehicles, mechanical safety against external impact is important. A test representing such a mechanical safety test is a nail penetration test.

The separator according to the present disclosure can provide a crosslinked polyolefin separator having excellent safety in a nail penetration test.

According to an embodiment of the present disclosure, the separator may be a crosslinked polyolefin separator which satisfies the following [Formula 1] and [Formula 2] in a nail penetration test wherein a nail having a temperature of 250° C. or higher is dropped vertically:

$$b/a \leq 3.0 \qquad \text{[Formula 1]}$$

$$c/(b-a) \geq 0.75 \qquad \text{[Formula 2]}$$

wherein a represents a diameter of nail used in the nail penetration test, b represents a diameter of separator lost after nail penetration in the nail penetration test, and c represents a length of pore-blocked region after nail penetration.

According to an embodiment of the present disclosure, b/a may be 3.0 or less, 1.0-2.5 or 1.0-2.0.

According to an embodiment of the present disclosure, c/(b−a) may be 0.75 or more, or 1.0 or more.

Herein, a, b and c may be observed and length thereof may be determined through a scanning electron microscope (SEM) or optical microscope. As used herein, a, b and c may be expressed in the unit of mm, but are not limited thereto.

Figure 3:
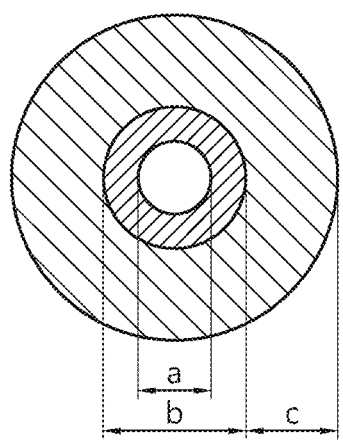
FIG. 3 is a schematic top view illustrating the portion of a separator penetrated by a nail after a nail penetration test.
Figure 4A:
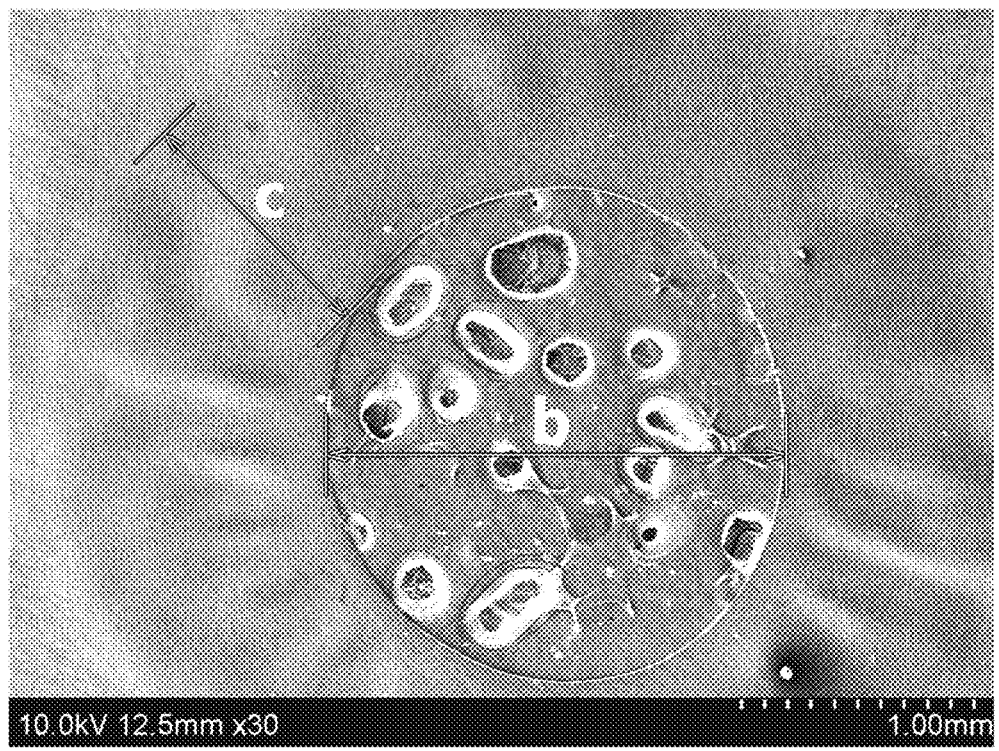
FIGS. 4a and 4b are scanning electron microscopic (SEM) images illustrating the separator according to an embodiment of the present disclosure, after a nail penetration test.
Figure 4B:
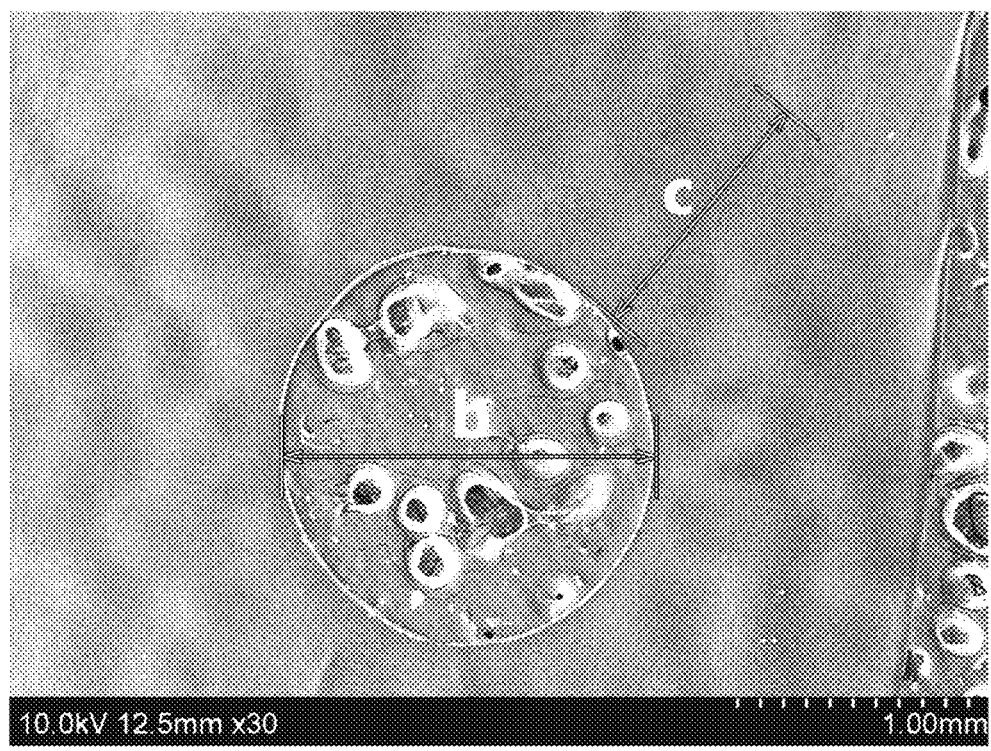
Figure 5A:
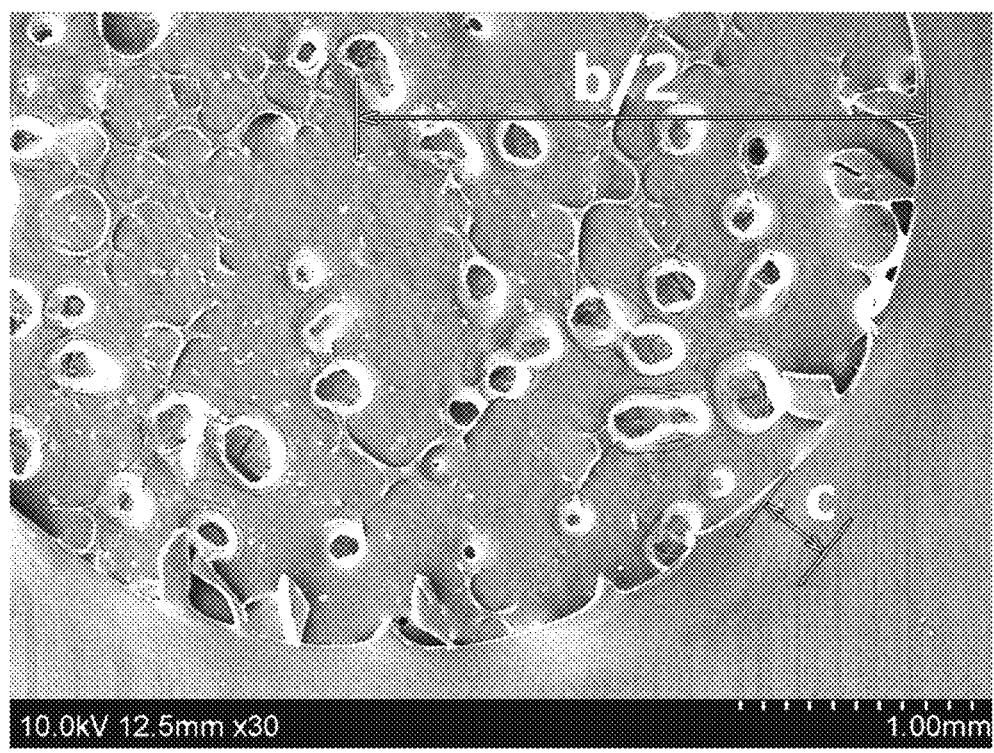
FIGS. 5a, 5b and 5c are SEM images illustrating the separator according to Comparative Example, after a nail penetration test.
Figure 5B:
Figure 5C:
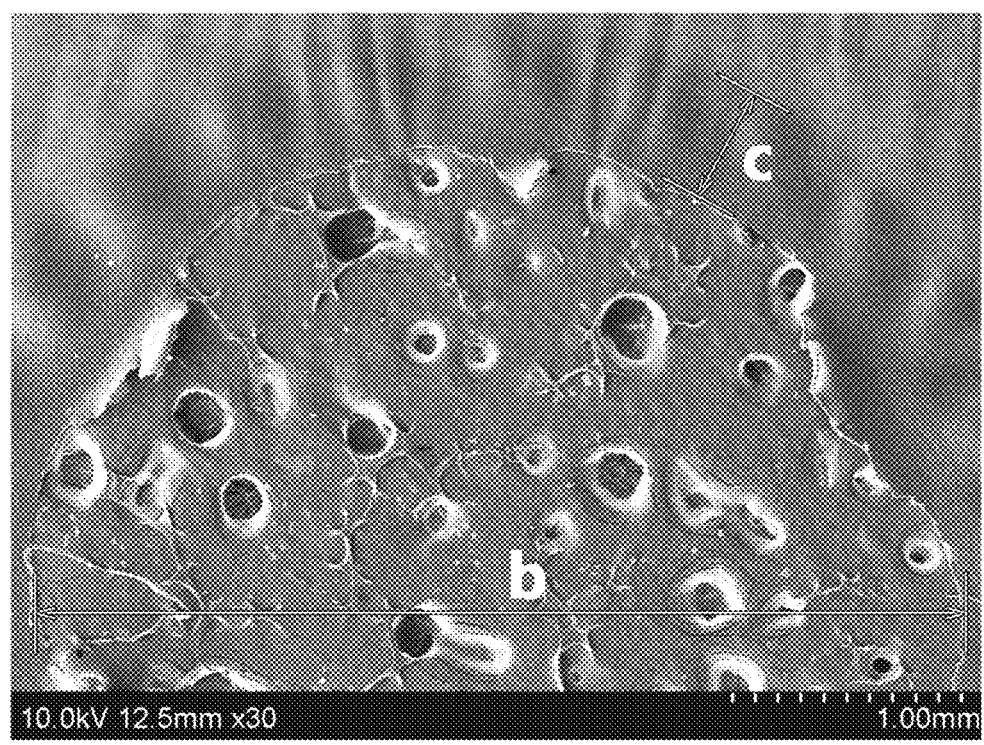

More particularly, 'a' represents the diameter of a nail shank used for a nail penetration test and corresponds to a fixed value in each test. In general, a nail includes a head, shank and a tip. As used herein, 'nail diameter' means the diameter of a shank, and the shank has the same diameter as a whole. When the nail shank is not cylindrical, 'nail shank diameter' means the diameter when the nail shank is converted into a cylindrical shank. In FIG. 3, the nail shank diameter is marked by 'a'.

In addition, 'b' represents a diameter of separator lost after nail penetration in the nail penetration test. In other words, 'b' corresponds to the diameter of a hole measured in a hole region formed in a circular shape, when the separator is observed by SEM or optical microscope after the nail penetration test. In FIG. 3, the diameter of separator loss is marked by 'b'. When the hole formed in the separator after the nail penetration test does not have a circular shape, but has an elliptical, crushed circular shape or a polygonal shape, the hole is converted into a circle having the same area and 'b' is determined as the diameter of the circle.

Herein, 'b' may be observed and length thereof may be determined through a scanning electron microscope (SEM) or optical microscope.

In addition, 'c' represents a length of pore-blocked region after nail penetration, such a region is generated continuously after the separator loss is generated, and can be identified through a difference in brightness from the regions in which pores are preserved. In other words, the region is identified as a dark region appearing in SEM or a clear region appearing in optical microscopy. Herein, 'c' may be determined by measuring the length. For example, 'c' may be determined by determining the radius from the center of a circular shaped lost region to the circumference of the pore-blocked region, and subtracting the radius of the lost region from the radius of the pore-blocked region. However, the scope of the present disclosure is not limited thereto. In FIG. 3, the pore-blocked region after nail penetration is marked by 'c'.

A separator satisfying the above [Formula 1] in the nail penetration test means that the separator has a low heat shrinking ratio and generates a small area lost additionally by heat after nail penetration. In addition, a separator satisfying the above [Formula 2] in the nail penetration test means that there is a region retaining a function as separator by virtue of a high melt-down temperature of the separator. In addition, a separator satisfying [Formula 1] but not satisfying [Formula 2] in the nail penetration test means that there is a risk of ignition caused by additional thermal runaway at the tested temperature or higher. In this case, the separator may cause delayed ignition caused by an increase in temperature after nail penetration. Further, a separator not satisfying [Formula 1] but satisfying [Formula 2] in the nail penetration test means that it is not possible to ensure safety due to excessive energy of initial short-circuit, even when the separator realizes a high melt-down temperature. In this case, the separator causes ignition immediately during nail penetration.

Figure 6A:
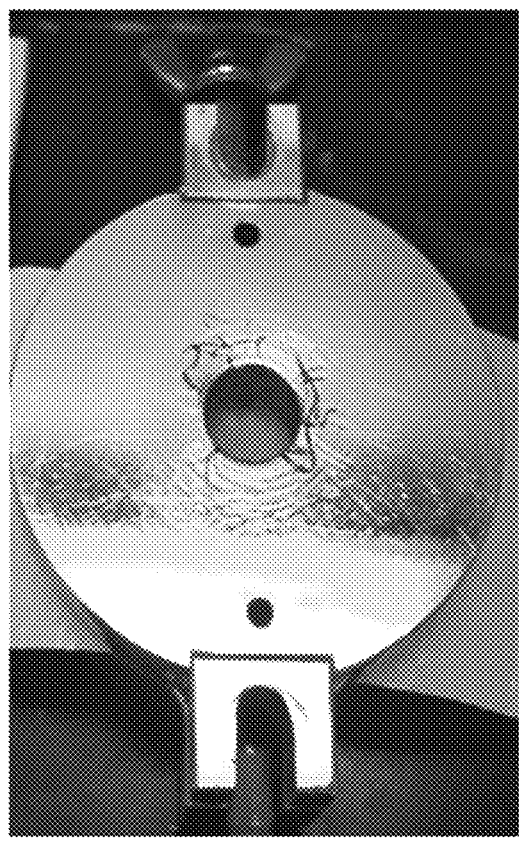
FIGS. 6a-6c illustrates images illustrating the nail penetration test according to the present disclosure step by step.
Figure 6B:
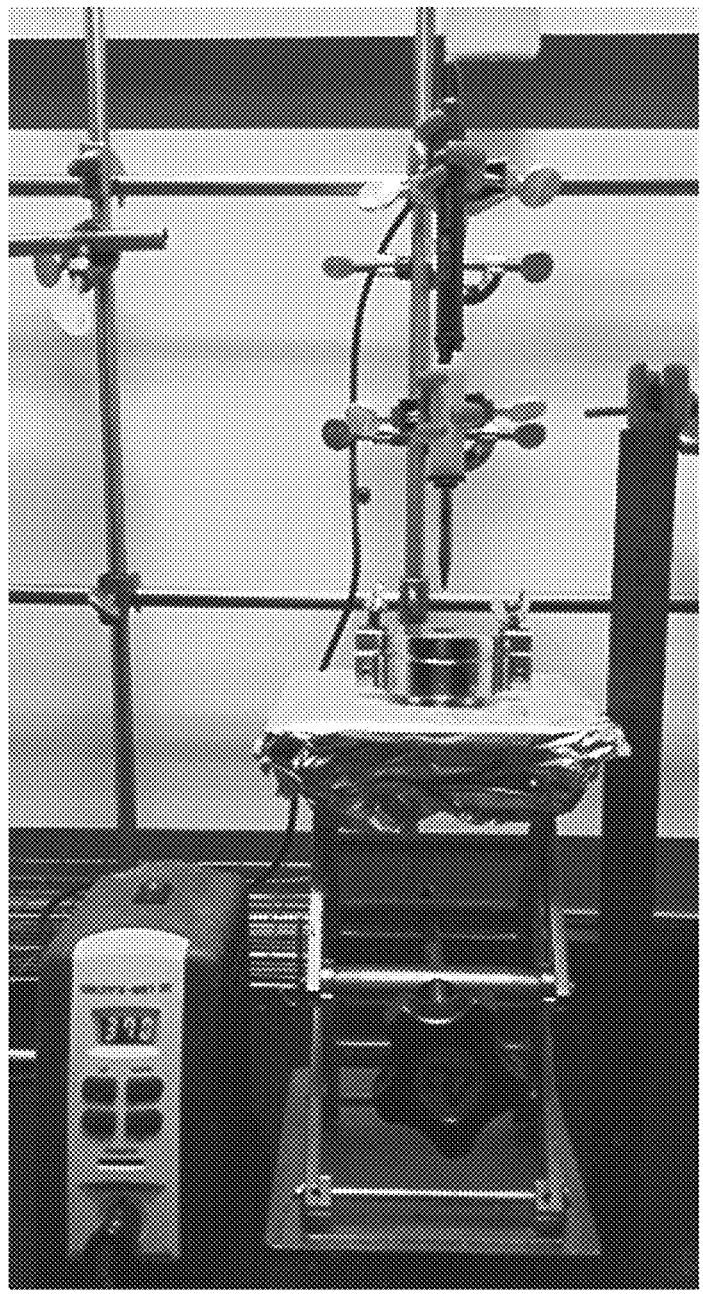
Figure 6C:
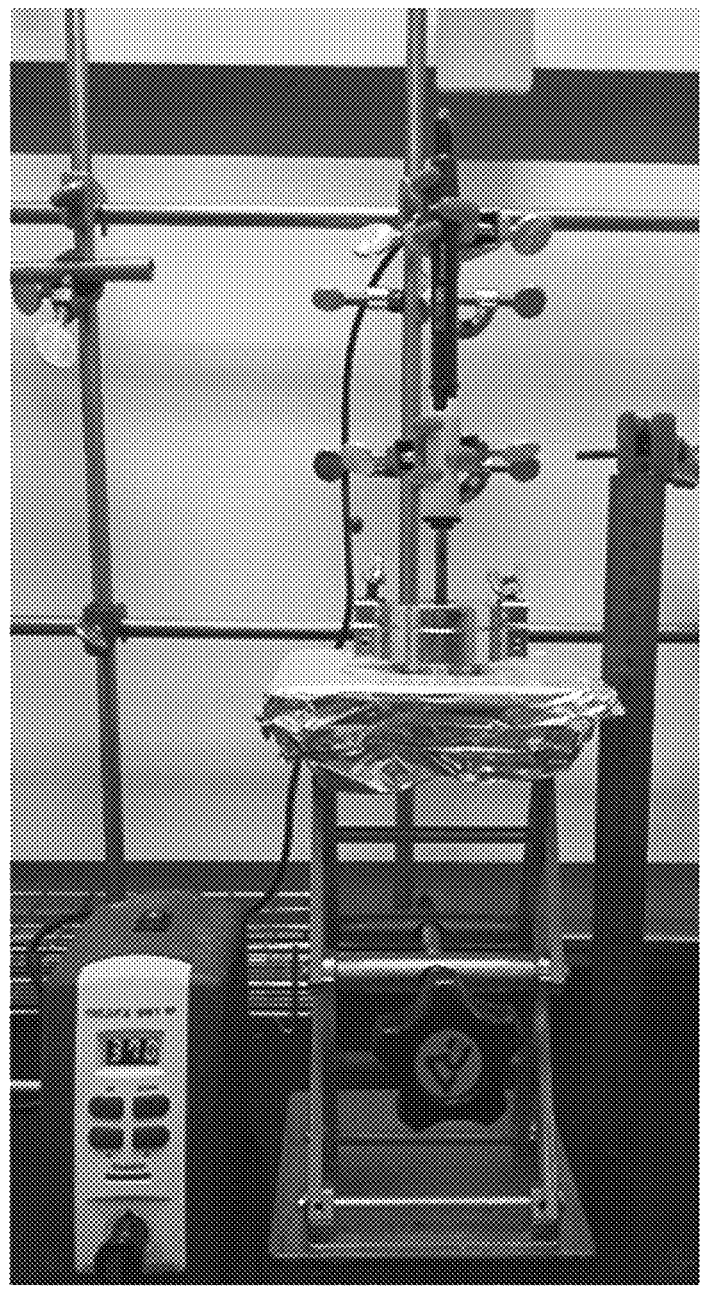

Hereinafter, the nail penetration test method will be explained with reference to photographic images and drawings. FIG. 6a shows an image illustrating a sample loader on which a separator is loaded during the nail penetration test, and a fixing jig. FIG. 6b shows an image taken from the lateral side at the moment where a nail is dropped vertically toward the separator on the sample loader during the nail penetration test. FIG. 6c shows an image taken from the lateral side at the moment where the nail penetrates through the separator on the sample loader during the nail penetration test. The images are illustrated in FIGS. 7a-7d so that the nail penetration test may be understood more clearly. Hereinafter, the nail penetration test will be explained with reference to FIGS. 7a-7d.

The nail penetration test may be carried out at room temperature, i.e. 20-25° C.

The nail 10, used for the nail penetration test, more particularly the shank 10a and tip 10b of the nail penetrating the separator may be heated to a temperature of 250° C. or higher, such as 370° C. In addition, the shank 10a and tip 10b may be made of a metallic material to which heat is transferred with ease from a heating source, and the material is not particularly limited as long as it retains rigidity at the corresponding temperature range. The shank 10a of nail has a diameter of 'a'.

The tip of nail 10 may have a cone-like shape and may be formed at an angle of 15-60°. Particularly, the tip may have an angle of 30°.

The sample loader 30 may include an upper loader 30a and a lower loader 30b, and a separator 20 to be tested is loaded between the upper loader 30a and the lower loader 30b and then fixed by a jig. Herein, the sample loader 30 is made of such a material that heat to be transferred to the separator 20 from the hot tip of nail 10 may not be transferred to the sample loader 30, and is preferably spaced apart by a sufficient interval. This is for the purpose of preventing any significant effect upon the test results. In addition, the sample loader 30 is preferably spaced apart from the bottom surface 40 by at least 15 mm to prevent heat transferred from the hot tip of nail 10 from being transferred again to the separator 20 after it is radiated on the bottom surface.

After the separator 20 is loaded between the upper loader 30a and the lower loader 30b of the sample loader 30 and fixed by a jig, the nail 10 is fixed to the nail penetration device and set in such a manner that it may be perpendicular to the separator 20 to the highest degree. Herein, the interval between the separator and nail tip may be 5-20 cm, 7-15 cm, or 10 cm.

Figure 7A:
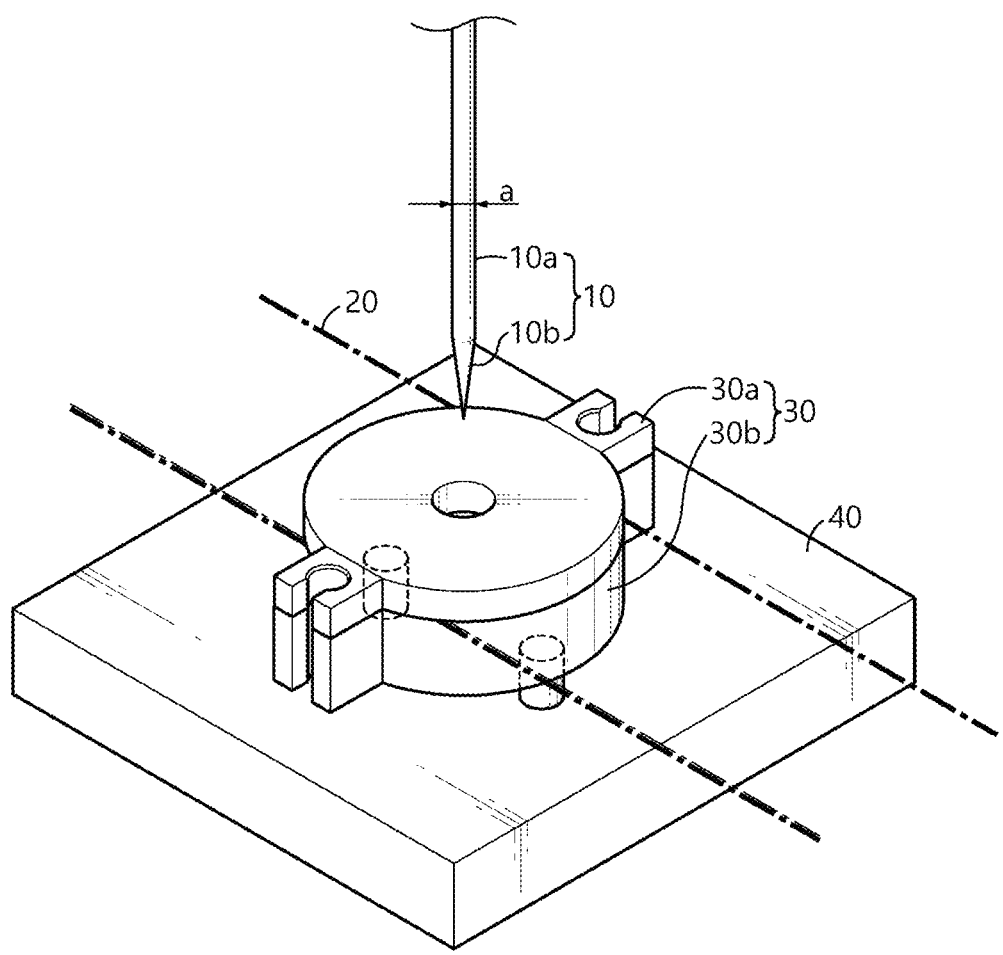
FIGS. 7a-7d are schematic views illustrating the nail penetration test according to the present disclosure step by step.
Figure 7B:
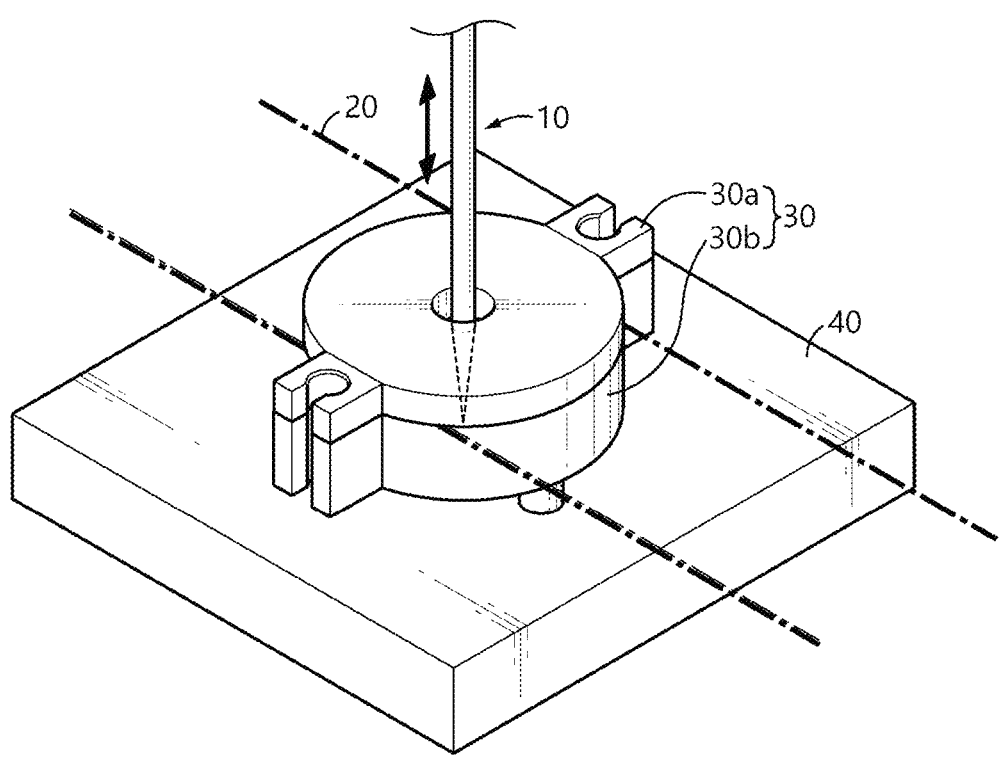

As shown in FIG. 7b, the nail 10 is dropped vertically to the separator 20 to carry out the nail penetration test so that it may penetrate through the separator. The nail may be dropped at a uniform velocity and penetrate through the separator, wherein the nail dropping rate may be 0.1-5.0 m/min, 0.3-4.0 m/min, or 0.5-3.0 m/min. When the nail dropping rate is not within the above-defined range, it is different from the actual nail penetration rate in a battery and cannot have any significant meaning as a simulation test.

Figure 7C:
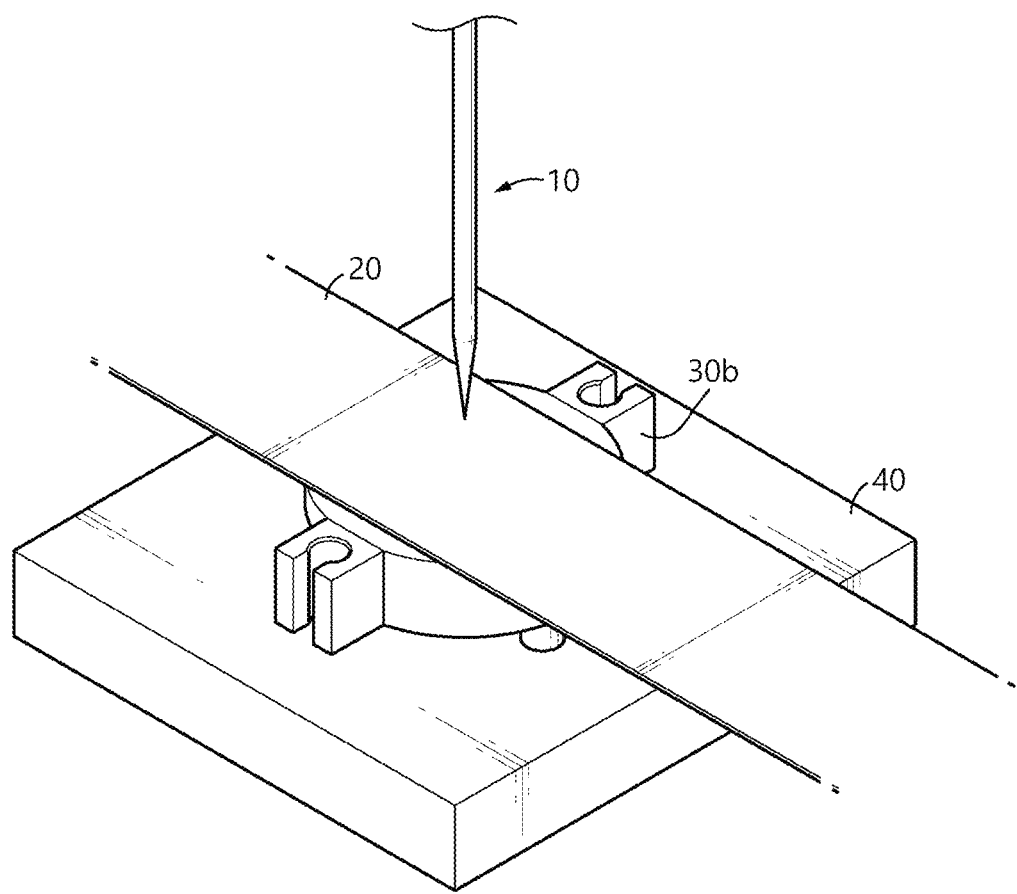

FIG. 7c shows an image from which the upper loader 30a of the sample loader 30 is removed so that the nail penetration test method may be understood more clearly.

Then, the nail 10 is dropped until it penetrates the separator 20 by 5 mm, is stopped, and then is fixed at the stopped position for 5-15 seconds or 10 seconds. When the fixing time is not within the above-defined range, it is different from the actual nail penetration rate in a battery and cannot have any significant meaning as a simulation test.

Figure 7D:
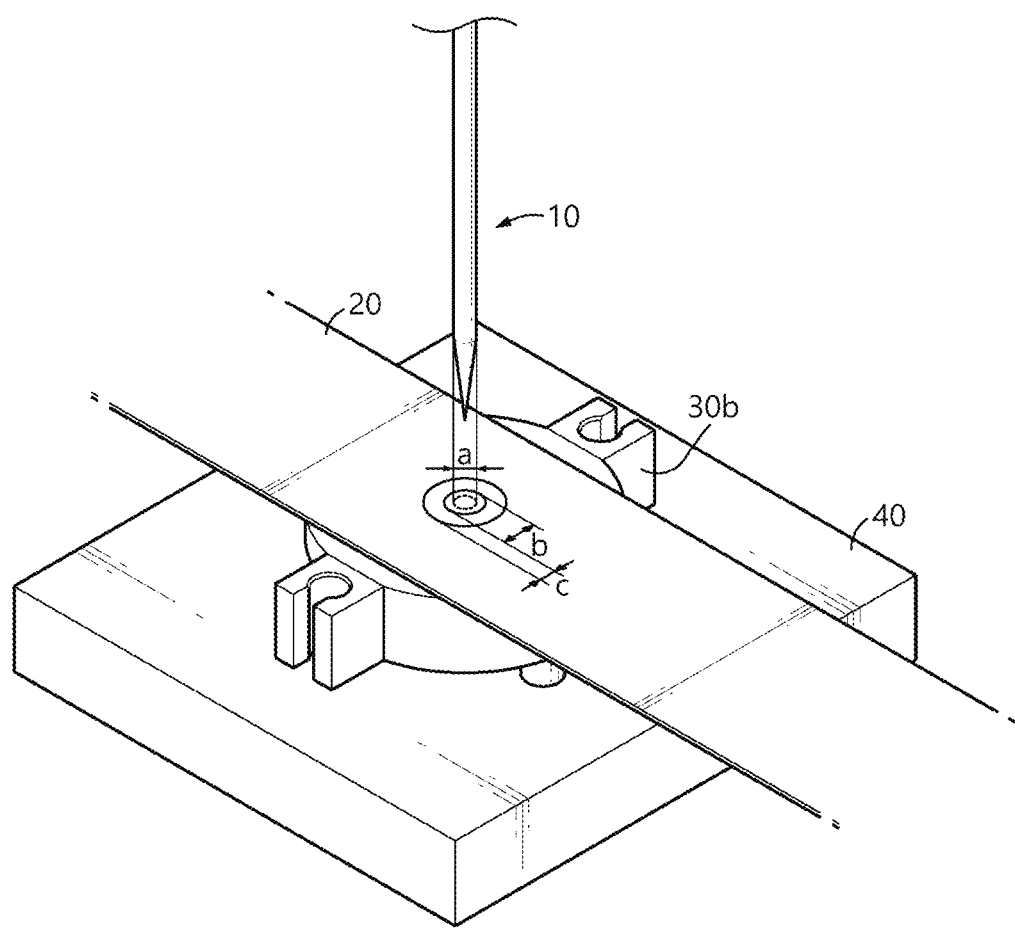

After that, as shown in FIG. 7d, the nail 10 is removed immediately and separated from the separator 20, and then the loss diameter ('b') and length ('c') of pore-blocked region formed in the separator after nail penetration are measured.

The silane-crosslinked polyolefin separator may have a melt-down temperature of 155° C. or higher.

Particularly, the silane-crosslinked polyolefin separator has a melt-down temperature of 155° C. or higher, 160-220° C., 170-210° C., or 180-200° C. Herein, 'melt-down temperature' means the temperature of a separator where the separator is shrunk, extended and broken when a load of 0.01 N is applied thereto by using a thermomechanical analyzer (TMA) and the temperature is increased at a rate of 5° C./min.

Since the crosslinked polyolefin separator has a high melt-down temperature of 155° C. or higher, it retains melt integrity at high temperature and shows excellent dimensional stability.

In addition, the silane-crosslinked polyolefin separator may have a puncture strength of 30-80 gf/μm, 30-70 gf/μm, 30-60 gf/μm, or 32-60 gf/m. Herein, 'puncture strength' means a value obtained by measuring the strength of a porous membrane when it is pressed and broken by using a needle with a diameter of 1 mm (radius of curvature of 0.5 mm) at a rate of 2 mm/sec, and dividing the strength by the thickness of the porous membrane.

In addition, the silane-crosslinked polyolefin separator has a crosslinking degree of 10% or more, 20-85%, or 40-75%. Herein, 'crosslinking degree' is a ratio obtained by weighing the initial weight of a separator, dipping the separator in decalin solution at 135° C. and boiling it therein for 4 hours according to ASTM D 2765, weighing the dry weight of residue, and calculating the ratio of the dry weight of residue based on the initial weight.

According to an embodiment of the present disclosure, the polyolefin crosslinked porous membrane may include a polyolefin porous substrate; and a crosslinked polyolefin layer disposed on at least one surface of the polyolefin porous substrate and at least a part of the pores of the polyolefin porous membrane, wherein the crosslinked polyolefin layer may have a crosslinked structure of siloxane crosslinking (—Si—O—Si—).

In another aspect, there is provided a method for manufacturing a crosslinked polyolefin separator, including the steps of:

(S1) preparing a polyolefin porous membrane;

(S2) applying a coating solution containing an initiator and alkoxy group-containing vinylsilane onto at least one surface of the porous membrane;

(S3) drying and thermally fixing the porous membrane coated with the coating solution; and (S4) crosslinking the thermally fixed porous membrane in the presence of water.

Hereinafter, the method for manufacturing a crosslinked polyolefin separator will be explained in detail step by step.

First, a polyolefin porous membrane is prepared (S1).

The polyolefin porous membrane prepared from step (S1) means a conventional polyolefin, i.e. non-grafted polyolefin porous membrane subjected no grafting, including silane grafting, and may be any polyolefin porous membrane used currently in the art with no particular limitation.

For example, the polyolefin porous membrane may be obtained by the following method.

According to an embodiment of the present disclosure, step (S1) may include the steps of: introducing polyolefin and a diluting agent to an extruder, followed by mixing, and carrying out extrusion to prepare a polyolefin composition; molding and orienting the extruded polyolefin composition in the form of a sheet; and extracting the diluting agent from the oriented sheet to obtain a porous membrane.

According to the related art, besides a diluting agent, crosslinking additives (such as an initiator, alkoxy group-containing vinylsilane (crosslinking agent)), crosslinking catalyst, or the like were introduced to and mixed in an extruder at once to carry out reactive extrusion, thereby preparing a silane-grafted polyolefin composition. However, since the above-mentioned process includes a step of extracting the diluting agent after the reactive extrusion of the composition, unreacted crosslinking additives or catalyst may be removed together with the diluting agent in the step of extracting the diluting agent. Thus, it is difficult to control crosslinking uniformly due to a change in process. In addition, there is a problem in that a deviation of thickness per width of the resultant separator is generated.

In addition, when polyolefin, a diluting agent, crosslinking agent, or the like, are introduced to and reacted in an extruder as mentioned above, it is difficult to increase the orientation ratio due to the mechanical properties of sheets changed by the reactive extrusion. In addition, a side effect, such as a large amount of gel formation, may occur in the extruder.

However, according to the present disclosure, a polyolefin porous membrane is prepared first by using polyolefin and a diluting agent, and then silane grafting is carried out in the subsequent thermal fixing step. In other words, after forming pores in the polyolefin porous membrane, a porous coating solution is applied to at least one surface of the porous membrane. Thus, silane grafting may be carried out on the surface of fibrils forming the polyolefin porous membrane and fibrils present on the pore surfaces. As a result, it is possible to provide a crosslinked polyolefin separator causing low gel formation while showing high processability.

According to an embodiment of the present disclosure, polyolefin may be polyethylene; polypropylene; polybutylene; polypentene; polyhexene; polyoctene; a copolymer of at least two of ethylene, propylene, butene, pentene, 4-methylpentene, hexane, heptane and octene; or a mixture thereof.

Particularly, polyethylene includes low-density polyethylene (LDPE), linear low-density polyethylene (LLDPE), high-density polyethylene (HDPE), or the like. Among those, high-density polyethylene having a high crystallization degree and a high resin melting point is most preferred.

According to an embodiment of the present disclosure, polyethylene may have a weight average molecular weight of 200,000-1,000,000, 220,000-700,000, or 250,000-500,000. According to the present disclosure, it is possible to obtain a separator having excellent strength and heat resistance while ensuring uniformity and film forming processability of the separator film by using high-molecular weight polyolefin having a weight average molecular weight of 200,000-1,000,000 as a starting material for manufacturing the separator.

According to an embodiment of the present disclosure, the diluting agent may include liquid or solid paraffin oil, mineral oil, wax, soybean oil, or the like, used currently for manufacturing a separator through a wet process.

According to an embodiment of the present disclosure, the diluting agent may be one capable of liquid-liquid phase separation against polyolefin. For example, the diluting agent may be a phthalic acid ester, such as dibutyl phthalate, dihexyl phthalate, dioctyl phthalate, or the like; aromatic ether, such as diphenyl ether, benzyl ether, or the like; C10-C20 fatty acid, such as palmitic acid, stearic acid, oleic acid, linolic acid, linoleic acid, or the like, C10-C20 fatty acid alcohol, such as palmitic acid alcohol, stearic acid alcohol, oleic acid alcohol, or the like; saturated or unsaturated fatty acid whose fatty acid group has 4-26 carbon atoms, such as palmitic acid mono-, di- or tri-ester, stearic acid mono-, di- or tri-ester, oleic acid mono-, di- or tri-ester, linoleic acid mono-, di- or tri-ester, or the like; or a fatty acid ester in which one or at least two fatty acids having an epoxy-substituted double bond of unsaturated fatty acid are ester-bound with a C1-C10 alcohol having 1-8 hydroxyl groups.

The diluting agent may include any one of the above-described ingredients or a mixture of at least two of them.

According to an embodiment of the present disclosure, the content of diluting agent may be 100-350 parts by weight, 125-300 parts by weight, or 150-250 parts by weight, based on 100 parts by weight of polyolefin. When the total content of diluting agent satisfies the above-defined range, it is possible to solve the problems of a decrease in porosity and pore size and significant degradation of permeability due to reduced interconnection of pores caused by a large amount of polyolefin, and a difficulty in processing caused by an increase in viscosity of the polyolefin composition and an increase in extrusion load. It is also possible to solve the problems of degradation of miscibility of polyolefin with the diluting agent caused by a small amount of polyolefin, extrusion of polyolefin in the form of gel while polyolefin is not mixed thermodynamically with the diluting agent, and thus failure upon orientation and non-uniform thickness.

According to an embodiment of the present disclosure, the step of preparing a polyolefin composition may be carried out by using a uniaxial extruder or biaxial extruder.

Next, the extruded polyolefin composition is molded in the form of a sheet and oriented.

For example, the extruded polyolefin composition is extruded by using an extruder equipped with a T-die, or the like, and then cooled extrudate may be formed by using a general casting or calendaring process using water-cooling or air-cooling mode.

According to an embodiment of the present disclosure, it is possible to provide a separator having improved mechanical strength and puncture strength through the orientation step as mentioned above.

According to an embodiment of the present disclosure, the orientation may be carried out by sequential or simultaneous orientation using a roll or tenter. The orientation ratio may be 3 times or more, or 5-12 times, each in the machine direction and transverse direction, and the total orientation ratio may be 20-80 times. When the orientation ratio satisfies the above-defined ratio, it is possible to prevent the problem of insufficient orientation in one direction, a failure in balance of physical properties between the machine direction and the transverse direction, and degradation of tensile strength and puncture strength. When the total orientation ratio satisfies the above-defined range, it is possible to prevent the problems of non-orientation or a failure in pore formation.

When silane grafting and extrusion of the composition are performed at the same time by carrying out silane grafting in the step of extruding the polyolefin composition according to the related art, the silane-crosslinked polyolefin porous membrane undergoes a change in mechanical properties due to the reactive extrusion. Thus, there is a limitation in orientation ratio in the orientation step. However, according to the present disclosure, a non-grafted porous membrane is prepared first. In other words, when preparing the porous membrane, only the diluting agent is allowed to react with polyolefin and no silane grafting occurs. Therefore, the resultant membrane undergoes no significant change in mechanical properties, and thus the extruded polyolefin composition may be controlled to a high orientation ratio in the subsequent orientation step.

According to an embodiment of the present disclosure, the extruded polyolefin composition may be oriented 8-12 times, 9-12 times, or 11-12 times, each in the machine direction and the transverse direction. Thus, it is possible to obtain a separator having a higher heat shrinkage. On the contrary, as can be seen from Comparative Example 3, the separator obtained according to the related art causes breakage at a high orientation ratio.

According to an embodiment of the present disclosure, the orientation temperature may be varied depending on the melting point of polyolefin, concentration and type of the diluting agent, or the like.

According to an embodiment of the present disclosure, when the polyolefin is polyethylene, the orientation temperature may be 70-160° C., 90-140° C., or 100-130° C. in the machine direction, and may be 90-180° C., 110-160° C., or 120-150° C. in the transverse direction.

When the orientation temperature satisfies the above-defined range, it is possible to prevent the problem of breakage or non-orientation due to the lack of softness, caused by a low orientation temperature. In addition, it is possible to prevent over-orientation or a difference in physical properties, caused by a high orientation temperature.

Then, the diluting agent is extracted from the oriented sheet to obtain a porous membrane.

According to an embodiment of the present disclosure, the diluting agent may be extracted from the oriented sheet by using an organic solvent and then dried to obtain a porous membrane.

According to an embodiment of the present disclosure, the organic solvent is not particularly limited, as long as it is capable of extraction of the diluting agents. However, it is suitable to use methyl ethyl ketone, methylene chloride or hexane having high extraction efficiency and showing a high drying rate.

According to an embodiment of the present disclosure, the extraction may be any conventional solvent extraction process, such as an immersion process, solvent spray process or ultrasonication process, and such processes may be used alone or in combination. After carrying out extraction, the content of residual diluting agents should be preferably 1 wt % or less. When the content of residual diluting agent is larger than 1 wt %, physical properties are degraded and permeability of the porous membrane is reduced. The content of residual diluting agent may be affected by extraction temperature and extraction time. To increase the solubility of diluting agent in the organic solvent, a higher extraction temperature is preferred. However, considering the safety problem caused by boiling of the organic solvent, the extraction temperature is preferably 40° C. or lower. When the extraction temperature equals to or is lower than the solidifying point of the diluting agents, extraction efficiency may be decreased significantly. Thus, the extraction temperature should be higher than the solidifying point of the diluting agent.

In addition, the extraction time may be varied with the thickness of a porous membrane. In the case of a separator having a thickness of 5-15 μm, the extraction time may be 1-3 minutes suitably.

After that, a coating solution containing an initiator and alkoxy group-containing vinylsilane is applied onto at least one surface of the polyolefin porous membrane (S2).

According to the present disclosure, a coating solution containing a composition capable of silane crosslinking is coated onto the polyolefin porous membrane itself, the pores of which are exposed preliminarily. Thus, the coating solution can permeate even to the fibrils present on the preliminarily formed pore surfaces. Therefore, it is possible to carry out silane crosslinking uniformly in the thickness direction of the porous membrane.

According to an embodiment of the present disclosure, the alkoxy group-containing vinylsilane is a crosslinking agent capable of generating crosslinking, and functions to crosslink polyolefin through the grafting to polyolefin with vinyl groups and the aqueous crosslinking with alkoxy groups.

According to an embodiment of the present disclosure, the alkoxy group-containing vinylsilane may be any one of trimethoxyvinylsilane, triethoxyvinylsilane and triacetoxyvinylsilane, or a mixture of two or more of them.

According to an embodiment of the present disclosure, the alkoxy group-containing vinylsilane may be a mixture of trimethoxyvinylsilane with triethoxyvinylsilane, and the mixing ratio thereof may be selected considering the temperature in the thermal fixing step and the boiling point of the alkoxy group-containing vinylsilane.

According to an embodiment of the present disclosure, the alkoxy group-containing vinylsilane may be a mixture of trimethoxyvinylsilane with triethoxyvinylsilane, and the weight ratio of trimethoxyvinylsilane to triethoxyvinylsilane may be 90:10-30:70, 80:20-40:60, or 70:30-50:50. When the ratio satisfies the above-defined range, it is possible to complete crosslinking in the thermal fixing step and to remove the surplus crosslinking additives completely.

According to an embodiment of the present disclosure, the content of alkoxy group-containing vinylsilane may be 0.5-10.0 parts by weight, 0.7-7.0 parts by weight, or 1.0-5.0 parts by weight, based on 100 parts by weight of polyolefin. When the content of alkoxy group-containing vinylsilane satisfies the above-defined range, it is possible to prevent the problems of a decrease in silane grafting ratio, caused by a low silane content or degradation of the appearance of the resultant sheet, caused by a high silane content and the remaining unreacted silane.

According to an embodiment of the present disclosure, the initiator may be any initiator with no particular limitation, as long as it can generate radicals. Non-limiting examples of the initiator include 2,5-dimethyl-2,5-di(tert-butylperoxy)hexane (DHBP), benzoyl peroxide, acetyl peroxide, dilauryl peroxide, di-tert-butyl peroxide, dicumyl peroxide, cumyl peroxide, hydrogen peroxide, potassium persulfate, or the like.

According to an embodiment of the present disclosure, the content of initiator may be 0.1-20 parts by weight, particularly 1-10 parts by weight, and more particularly 2-5 parts by weight, based on 100 parts by weight of the alkoxy group-containing vinylsilane. When the content of initiator satisfies the above-defined range, it is possible to prevent the problems of a decrease in silane graft ratio, caused by a low content of initiator, and over-crosslinking on the surface of the porous membrane, caused by a high content of initiator.

According to an embodiment of the present disclosure, the coating solution may further include a crosslinking catalyst.

The crosslinking catalyst is added in order to accelerate silane crosslinking.

According to an embodiment of the present disclosure, the crosslinking catalyst may be a carboxylate of metal, such as tin, zinc, iron, zinc or cobalt, organic base, inorganic acid or an organic acid. Non-limiting examples of the crosslinking catalyst include metal carboxylates, such as dibutyltin dilaurate, dibutyltin diacetate, stannous acetate, stannous caprylate, zinc naphthenate, zinc caprylate and cobalt naphthenate, organic bases, such as ethylamine, dibutylamine, hexylamine and pyridine, inorganic acids, such as sulfuric acid and hydrochloric acid, and organic acids, such as toluene, sulfonic acid, acetic acid, stearic acid and maleic acid. Such crosslinking agents may be used alone or in combination.

According to an embodiment of the present disclosure, the content of crosslinking catalyst may be 0.1-20 parts by weight, 1-10 parts by weight, or 2-5 parts by weight, based on 100 parts by weight of the alkoxy group-containing vinylsilane. When the content of crosslinking catalyst satisfies the above-defined range, it is possible to carry out silane crosslinking to a desired level and to prevent undesired side reactions in a lithium secondary battery.

According to an embodiment of the present disclosure, the coating solution may further include conventional additives for improving specific functions, such as a surfactant, oxidation stabilizer, UV stabilizer, antistatic agent and a nucleating agent, if necessary.

Then, the porous membrane coated with the coating solution is dried and thermally fixed (S3).

The thermal fixing is a process of fixing and heating the porous membrane so that the porous membrane to be shrunk may be fixed forcibly to remove residual stress.

According to an embodiment of the present disclosure, silane grafting may occur in the porous membrane at the same time in the thermal fixing time. Particularly, in the thermal fixing step, silane coupling occurs simultaneously with thermal fixing, and the remaining alkoxy group-containing vinylsilane may be removed through evaporation.

According to an embodiment of the present disclosure, the thermal fixing temperature may be 110-145° C., 120-140° C., 123-137° C., or 126-132° C. When the thermal fixing temperature satisfies the above-defined range, it is possible to carry out crosslinking and to remove unreacted alkoxy group-containing vinylsilane while relieving the residual stress of the porous substrate.

According to an embodiment of the present disclosure, the thermal fixing time may be 10-120 seconds, 20-90 seconds, or 30-60 seconds. When the thermal fixing time satisfies the above-defined range, polyolefin molecules may be rearranged to remove residual stress of the porous membrane, and the problem of pore blocking of the porous membrane caused by partial melting may be reduced.

According to an embodiment of the present disclosure, the thermal fixing temperature may be 110-145° C., and the alkoxy group-containing vinylsilane may include two types of alkoxy group-containing vinylsilane compounds having a different boiling point.

According to an embodiment of the present disclosure, the thermal fixing temperature may be 110-145° C., the alkoxy group-containing vinylsilane may be a mixture of trimethoxyvinylsilane with triethoxyvinylsilane, and the weight ratio of trimethoxyvinylsilane to triethoxyvinylsilane may be 90:10-30:70.

When trimethoxyvinylsilane is used at a high ratio, there is an advantage in that crosslinking can be performed rapidly. When triethoxyvinylsilane is used at a high ratio, the thermal fixing tank may be retained at a high temperature, which is favorable to relieving residual stress of the substrate. The weight ratio of trimethoxyvinylsilane to triethoxyvinylsilane may be controlled within the above-defined range considering the characteristics required for a finished product.

According to an embodiment of the present disclosure, in the thermal fixing step, the orientation ratio in the transverse direction (TD, width direction of a sheet) may be 1.05-1.75 times, 1.1-1.7 times, or 1.15-1.65 times, during the thermal fixing. According to the present disclosure, thermal fixing and orientation in TD are carried out at the same time so that the porous membrane may have increased porosity and thus the coating solution may permeate better into the pores of the porous membrane.

According to an embodiment of the present disclosure, in addition to the step of pressurizing the porous membrane coated with the coating solution containing the initiator and alkoxy group-containing vinylsilane, or instead of the step, the surplus crosslinking agent in the porous membrane coated with the coating solution may be removed through vaporization, which may be carried out in the thermal fixing step.

In other words, to remove the surplus crosslinking agent through vaporization, the thermal fixing step may be started at a temperature lower than the boiling point of the alkoxy group-containing vinylsilane and then completed at a temperature higher than the boiling point of the alkoxy group-containing vinylsilane. For the purpose of this, the temperature of the container or chamber used for the thermal fixing may be set to a temperature lower than the boiling point of the crosslinking agent (particularly, alkoxy group-containing vinylsilane) and then increased gradually so that the temperature may be higher than the boiling point of the crosslinking agent as the thermal fixing goes to completion. In this manner, it is possible to remove the surplus crosslinking agent through vaporization. For example, when using trimethoxyvinylsilane as a crosslinking agent, the temperature of the thermal fixing tank may be set to a temperature lower than 124° C., the boiling point of trimethoxyvinylsilane, and then increased to a temperature (e.g. 128° C.) higher than the boiling point of trimethoxyvinylsilane as the thermal fixing goes to completion, thereby removing trimethoxyvinylsilane through vaporization.

According to an embodiment of the present disclosure, when manufacturing a composite separator which includes a porous coating layer containing a mixture of inorganic particles with a binder polymer and formed on at least one surface of the thermally fixed porous membrane, the surplus crosslinking agent may be further removed in the step of applying the porous coating layer to the porous membrane, in addition to the step of pressurizing the porous membrane coated with the coating solution containing the initiator and alkoxy group-containing vinylsilane and/or the step of vaporizing the surplus crosslinking agent in the thermal fixing step. More particularly, when the composition containing inorganic particles and a binder polymer is coated onto at least one surface of the crosslinked polyolefin film, and then dried at a temperature of 60-140° C. or 70-130° C. for 0.1-5 minutes or 0.2-3 minutes, the crosslinking agent may be removed through vaporization. In addition, when the composition containing inorganic particles and a binder polymer is coated onto at least one surface of the crosslinked polyolefin film and then subjected to dipping phase separation, the crosslinking agent may be removed while carrying out washing with water after the dipping phase separation.

According to an embodiment of the present disclosure, the method may further include the step of removing the coating solution, between step (S2) and step (S3).

For example, the coating solution may be removed by pressurizing the porous membrane coated with the coating solution.

When step (S2) is carried out, it is preferred that the coating solution is applied uniformly in an adequate amount according to the volume of pores present inside of the exposed pores. However, the coating solution is applied in an excessive amount actually, and thus it may be disposed mainly on the pore surface portions. Thus, there are problems in that surface crosslinking occurs intensively and thus air permeation time may be degraded.

To improve the above-mentioned problem, the step of removing the surplus coating solution is carried out according to an embodiment of the present disclosure. Therefore, it is possible to carry out crosslinking more uniformly in the width direction of the separator and to provide the separator with improved air permeation time.

Figure 2:
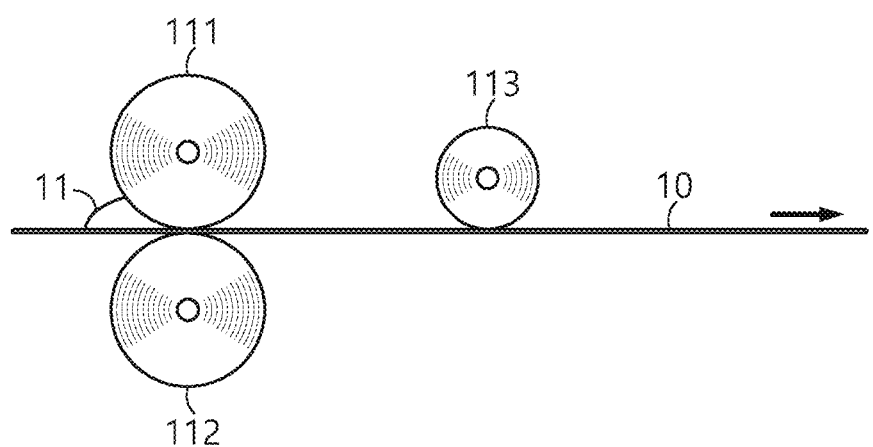
FIG. 2 is a schematic view illustrating the step of removing a coating solution according to an embodiment of the present disclosure.

FIG. 2 is a schematic view illustrating the step of pressurizing the porous membrane coated with the coating solution according to an embodiment of the present disclosure. Referring to FIG. 2, when the coating solution is applied onto the surface of the porous membrane 100, the surplus coating solution 11 is present. Herein, the porous membrane is pressurized with a first roller 111 and a second roller 112 to remove the surplus coating solution 11.

According to the present disclosure, the pressurization method is carried out to remove the surplus coating solution, and the method is not particularly limited as long as it is used currently in the art.

According to an embodiment of the present disclosure, the step of pressurizing the porous membrane coated with the coating solution may be carried out by allowing the porous membrane to pass through a gap between the first roller and the second roller facing each other to remove the surplus coating solution.

According to an embodiment of the present disclosure, the rollers may further include a controller unit configured to control the gap between the first roller and the second roller.

According to an embodiment of the present disclosure, the gap between the first roller and the second roller is +10 µm to −10 µm, or +7 µm to −7 µm. Herein, the gap, S, is defined by the following formula:

$$S=D-(R_1+R_2+T),$$

wherein D represents a distance between the first roller center and the second roller center, $R_1$ represents the first roller radius, $R_2$ represents the second roller radius, and T represents the thickness of the polyolefin porous membrane When the gap, S, between the first roller and the second roller is a negative (−) value, the first roller and the second roller use a deformable material (e.g. rubber) and the rollers may be pressurized against each other upon contact with each other depending on pressurization degree. In this case, 'distance between the first roller center and the second roller center, D' is smaller than 'the sum of the radius of the first roller, the radius of the second roller and the thickness of the porous substrate'.

It is possible to remove only the surplus coating solution, while preventing the porous membrane from being damaged, by maintaining the gap within the above-defined range.

Particularly, the porous membrane has a porosity of 50% or more according to an embodiment of the present disclosure, and thus the porous membrane can be pressurized approximately to a half of the thickness thereof. Therefore, the gap between the first roller and the second roller may be a negative value.

According to an embodiment of the present disclosure, the pressurization using rolls may be controlled to a linear pressure of 0.1-100 kgf/cm, 0.5-80 kgf/cm, or 1-50 kgf/cm. When carrying out pressurization within the above-defined range, it is possible to remove only the surplus coating solution, while preventing the porous membrane from being damaged.

According to an embodiment of the present disclosure, the method may further include a rubbing step of absorbing the coating solution between the step of removing the coating solution and the thermal fixing step (S3)

Referring to FIG. 2, the remaining coating solution 11 may be further removed by using a rubbing roller 113, or the like.

According to the present disclosure, the method may further include a rubbing step of absorbing the surplus coating solution, in addition to the physical pressurization step.

According to an embodiment of the present disclosure, the rubbing step uses a rubbing roller or rubbing cloth. The rubbing roller or rubbing cloth may include any one absorbing member selected from non-woven web, cotton, paper and liquid-absorbing sheets, or two or more absorbing members of them. For example, in the case of a rubbing roller, it may include the absorbing member attached to the outer circumferential surface of a conventional roller. In the case of the rubbing cloth, an absorbing member, such as non-woven web, may be used, as it is, i.e. in a planar shape, or may be modified into a roll shape, like a rubbing roller, to increase absorption processability.

Next, the thermally fixed porous membrane is crosslinked in the presence of water (S4).

According to an embodiment of the present disclosure, the crosslinking may be carried out at 60-100° C., 65-95° C., or 70-90° C.

According to an embodiment of the present disclosure, the crosslinking may be carried out at a humidity of 60-95% for 12-50 hours.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

First, 10.5 kg of high-density polyethylene (Korea Petrochemical Ind. Co. Ltd., VH035) having a weight average molecular weight of 380,000 as polyolefin, and 13.65 kg of liquid paraffin oil (Kukdong Oil & Chem. LP350F, dynamic viscosity 67.89 cSt at 40° C.) as a diluting agent were introduced to and mixed in an extruder, and extrusion was carried out at a temperature of 210° C. to prepare a polyethylene composition.

The resultant polyethylene composition was molded into a sheet-like shape through a T-die and cold casting roll, and then biaxial orientation was carried out by using a tenter-type sequential orienting machine performing MD orientation and then TD orientation. Both the MD orientation ratio and the TD orientation ratio were 7.5 times. The orientation temperature was 108° C. in MD and 121° C. in TD.

The oriented sheet was dipped in methylene chloride to extract the diluting agent, thereby providing a porous membrane.

Then, a coating solution was applied onto one surface of the porous membrane. The coating solution included 450 g of trimethoxyvinylsilane as alkoxy group-containing vinylsilane, 6 g of dibutyltin dilaurate as a crosslinking catalyst and 6 g of 2,5-dimethyl-2,5-di(tert-butylperoxy)hexane (DHBP) as an initiator.

After that, the porous membrane coated with the coating solution was dried and thermally fixed at 127° C. to obtain a porous membrane at a TD orientation ratio controlled to 1.1 times. Herein, silane grafting occurred at the same time in the thermal fixing step.

Finally, the thermally fixed porous membrane was crosslinked at 85° C. under a humidity condition of 85% for 48 hours to obtain a crosslinked polyethylene separator. The resultant crosslinked polyethylene separator had a thickness of 9.0 μm.

Example 2

A separator was obtained in the same manner as Example 1, except that 300 g of trimethoxyvinylsilane and 150 g of triethoxyvinylsilane were used as alkoxy group-containing vinylsilane and the thermal fixing temperature was controlled to 132° C. The resultant crosslinked polyethylene separator had a thickness of 9.0 μm.

Example 3

A separator was obtained in the same manner as Example 2, except that high-density polyethylene (Korea Petrochemical Ind. Co. Ltd., VH100U) having a weight average molecular weight of 700,000 was used as polyolefin and each of the MD orientation ratio and the TD orientation ratio was changed to 11 times. The resultant crosslinked polyethylene separator had a thickness of 9.0 μm.

Example 4

First, 10.5 kg of high-density polyethylene (Korea Petrochemical Ind. Co. Ltd., VH035) having a weight average molecular weight of 380,000 as polyolefin, and 13.65 kg of liquid paraffin oil (Kukdong Oil & Chem. LP350F, dynamic viscosity 67.89 cSt at 40° C.) as a diluting agent were introduced to and mixed in an extruder, and extrusion was carried out at a temperature of 210° C. to prepare a polyethylene composition.

The resultant polyethylene composition was molded into a sheet-like shape through a T-die and cold casting roll, and then biaxial orientation was carried out by using a tenter-type sequential orienting machine performing MD orientation and then TD orientation. Both the MD orientation ratio and the TD orientation ratio were 7.5 times. The orientation temperature was 108° C. in MD and 121° C. in TD.

The oriented sheet was dipped in methylene chloride to extract the diluting agent, thereby providing a porous membrane.

Then, a coating solution was applied onto one surface of the porous membrane. The coating solution included 450 g of trimethoxyvinylsilane as alkoxy group-containing vinylsilane and 6 g of 2,5-dimethyl-2,5-di(tert-butylperoxy) hexane (DHBP) as an initiator.

After that, the porous membrane coated with the coating solution was dried and thermally fixed at 127° C. to obtain a porous membrane at a TD orientation ratio controlled to 1.1 times. Herein, silane grafting occurred at the same time in the thermal fixing step.

Finally, the thermally fixed porous membrane was crosslinked at 85° C. under a humidity condition of 85% for 48 hours to obtain a crosslinked polyethylene separator. The resultant crosslinked polyethylene separator had a thickness of 9.0 μm.

Example 5

First, 10.5 kg of high-density polyethylene (Korea Petrochemical Ind. Co. Ltd., VH035) having a weight average molecular weight of 380,000 as polyolefin, and 13.65 kg of liquid paraffin oil (Kukdong Oil & Chem. LP350F, dynamic viscosity 67.89 cSt at 40° C.) as a diluting agent were introduced to and mixed in an extruder, and extrusion was carried out at a temperature of 210° C. to prepare a polyethylene composition.

The resultant polyethylene composition was molded into a sheet-like shape through a T-die and cold casting roll, and then biaxial orientation was carried out by using a tenter-type sequential orienting machine performing MD orientation and then TD orientation. Both the MD orientation ratio and the TD orientation ratio were 7.5 times. The orientation temperature was 108° C. in MD and 121° C. in TD.

The oriented sheet was dipped in methylene chloride to extract the diluting agent.

Then, a coating solution was applied onto one surface of the porous membrane. The coating solution included 450 g of trimethoxyvinylsilane as alkoxy group-containing vinylsilane, 6 g of dibutyltin dilaurate as a crosslinking catalyst and 6 g of 2,5-dimethyl-2,5-di(tert-butylperoxy)hexane (DHBP) as an initiator.

Then, the surplus coating solution was removed by pressurizing the porous membrane coated with the coating solution with two rollers facing each other in the longitudinal direction under a linear pressure of 9.8 kgf/cm. Herein, the gap between the first roller and the second roller was 0.0 μm. In other words, the first roller was in direct contact with the porous membrane and the second roller was also in direct contact with the porous membrane with no space between the two rollers.

Then, the surplus coating solution was removed by using a rubbing roller including a non-woven web.

After that, the resultant porous membrane was dried and thermally fixed at 127° C. to obtain a porous membrane at a TD orientation ratio controlled to 1.1 times.

Finally, the porous membrane coated with the porous coating layer was crosslinked at 85° C. under a humidity condition of 85% to obtain a crosslinked polyethylene separator. The resultant crosslinked polyethylene separator had a thickness of 9.0 m.

Example 6

A crosslinked polyethylene separator was obtained in the same manner as Example 5, except that the TD orientation ratio was controlled to 1.4 times in the thermal fixing step.

Example 7

A crosslinked polyethylene separator was obtained in the same manner as Example 5, except that dicumyl peroxide (DCP) was used as an initiator.

Example 8

A crosslinked polyethylene separator was obtained in the same manner as Example 6, except that triethoxyvinylsilane was used as alkoxy group-containing vinylsilane and the thermal fixing temperature was changed to 134° C.

Example 9

A crosslinked polyethylene separator was obtained in the same manner as Example 6, except that benzoyl peroxide (BPO) was used as an initiator.

Comparative Example 1

A separator was obtained in the same manner as Example 1, except that 10.5 kg of high-density polyethylene (Korea Petrochemical Ind. Co. Ltd., VH035) having a weight average molecular weight of 380,000 as polyolefin, 19.5 kg of liquid paraffin oil (Kukdong Oil & Chem. LP350F, dynamic viscosity 67.89 cSt at 40° C.) as a diluting agent, 450 g of trimethoxyvinylsilane as alkoxy group-containing vinylsilane, 6 g of dibutyltin dilaurate as a crosslinking catalyst, and 6 g of 2,5-dimethyl-2,5-di(tert-butylperoxy)hexane (DHBP) as an initiator were introduced to and mixed in an extruder at once. The resultant crosslinked polyethylene separator had a thickness of 9.0 m.

Comparative Example 2

A separator was obtained in the same manner as Comparative Example 1, except that the thermal fixing temperature was controlled to 132° C. The resultant crosslinked polyethylene separator had a thickness of 9.0 m.

Comparative Example 3

A separator was obtained in the same manner as Comparative Example 1, except that high-density polyethylene (Korea Petrochemical Ind. Co. Ltd., VH100U) having a weight average molecular weight of 700,000 was used as polyolefin and each of the MD orientation ratio and the TD orientation ratio was changed to 11 times. When manufacturing the separator, breakage occurred during the MD orientation. Thus, it was not possible to obtain a long wound separator.

Comparative Example 4

A separator was obtained in the same manner as Example 5, except that the step of applying the coating solution and pressurizing the coated porous membrane with rollers and the step of removing the coating solution with a rubbing roller were carried out before the TD orientation. The obtained polyolefin separator showed no surface crosslinking substantially.

Test Example 1

The physical properties of each of the separators according to Examples 1-9 and Comparative Examples 1-4 were determined.

1) Absorbance Ratio

For each of the separators according to Examples 1-9 and Comparative Examples 1-4, the ratio of the absorbance at 1090 cm$^{-1}$ where the functional group of —Si—OCH$_3$ derived from crosslinking is detected to the absorbance at 2920 cm$^{-1}$ where the characteristic peak of polyolefin before crosslinking is expressed was determined to carry out comparison in terms of crosslinking degree on the porous membrane surface. The results are shown in the following Table 1.

2) Calculation of Gel Formation

The number of gels with a longer side length of 50 m or more per 1 m$^2$ of each separator was determined by the naked eyes. The results are shown in the following Table 1.

3) Determination of Process Capability Index (Cp)

The process capability index of each separator was calculated by the following formula:

Process capability index=(Upper specification limit−Lower specification limit)/(6×Standard deviation)

Herein, the standard deviation is calculated considering only the variation within subgroups.

In addition, the upper specification limit (USL), lower specification limit (LSL) and standard deviation are shown schematically in FIG. 1. The results are shown in the following Table 2.

4) Determination of Silane (S1) Content in Separator

First, a separator specimen was allowed to react with sulfuric acid, sulfation was carried out on a hot plate, and then sulfuric acid was removed. Next, the resultant product was converted into ash in an electric furnace (temperature: 600° C.) for 4 hours and decomposed into nitric acid and hydrogen peroxide. Then, when the specimen was dissolved clearly, it was diluted with tertiary ultrapure water to prepare a sample to be analyzed.

The silane content in a separator was determined by using an inductively coupled plasma with mass spectrometer (ICP-MS), such as Axiom model, wherein MC-ICP-MS, Axiom is AXIOM MC model available from Thermo Elemental Ltd (GB) provided with high resolution. The results are shown in the following Table 2.

5) Determination of Resistance of Separator

Each of the separators according to Examples 1-9 and Comparative Examples 1-4 was dipped in an electrolyte and AC resistance was measured. The results are shown in the following Table 2. Herein, AC resistance was measured as resistance at 1 kHz by using Hioki tester.

6) Determination of Air Permeability

Air permeability was determined by using Gurley type air permeability tester according to JIS P-8117. Herein, the time required for 100 mL of air to pass through an area of 645 mm$^2$ with a diameter of 28.6 mm was measured. The results are shown in the following Table 2.

TABLE 1

| | Absorbance ratio, $I_{1090}/I_{2920}$ (×1000) | | | | Number of gels (number/m$^2$) |
|---|---|---|---|---|---|
| | OS | Center | DS | Average | Standard deviation | |
| Ex. 1 | 10.4 | 9.8 | 10.3 | 10.17 | 0.32 | 0 |
| Ex. 2 | 10.2 | 9.8 | 10.1 | 10.03 | 0.21 | 1 |
| Ex. 3 | 10.0 | 9.3 | 9.6 | 9.63 | 0.35 | 0 |
| Ex. 4 | 6.8 | 6.5 | 7.1 | 6.80 | 0.30 | 0 |
| Ex. 5 | 8.1 | 7.3 | 7.6 | 7.67 | 0.40 | 0 |
| Ex. 6 | 9.1 | 8.8 | 8.6 | 8.83 | 0.25 | 1 |
| Ex. 7 | 7.3 | 7.8 | 7.1 | 7.40 | 0.36 | 0 |
| Ex. 8 | 6.2 | 5.8 | 6.1 | 6.03 | 0.21 | 0 |
| Ex. 9 | 9.8 | 8.9 | 9.6 | 9.4 | 0.47 | 1 |
| Comp. Ex. 1 | 11.5 | 10.8 | 11.6 | 11.30 | 0.44 | 9 |
| Comp. Ex. 2 | 11.6 | 10.8 | 11.6 | 11.33 | 0.46 | 7 |
| Comp. Ex. 3 | 10.2 | 9.8 | 10.9 | 10.30 | 0.56 | 8 |
| Comp. Ex. 4 | 11.8 | 12.1 | 11.6 | 11.83 | 0.25 | 13 |

In Table 1, 'OS' refers to the absorbance ratio of the separator determined at the portion closest to the worker's operating side (OS). 'DS (drive side)' means the absorbance ratio of the separator determined at the portion closest to the motor-driving portion. 'Center' refers to the absorbance ratio of the separator sample taken at the central portion of the separator.

As can be seen from the results of Table 1, when the pressurizing step and rubbing step are not carried out, there are problems of rapid surface crosslinking and a high standard deviation.

In Comparative Examples 1 and 2, since polyolefin, the diluting agent and the crosslinking additives are introduced at once to the extruder, gel formation is higher than Examples, resulting in problems of appearance. In general, when the number of gels with a longer side length of 50 m or more per 1 m$^2$ of a separator obtained from a separator manufacturing process is larger than 3, such a separator is discarded as a defected product. Therefore, Comparative Examples 1 and 2 are not suitable for separators for electrochemical devices. On the contrary, it can be seen that the separator obtained by preparing a polyolefin porous membrane first and applying a coating solution containing alkoxy group-containing vinylsilane, or the like, to the porous membrane according to an embodiment of the present disclosure shows low gel formation, and thus is suitable for a separator for an electrochemical device.

TABLE 2

| | Process Capability Index (Cp) | Silane (Si) content in separator (ppm) | Resistance of separator (ohm) | Air permeability (s/100 mL) |
|---|---|---|---|---|
| Ex. 1 | 1.47 | 1620 | 0.32 | 66 |
| Ex. 2 | 1.52 | 1470 | 0.33 | 69 |
| Ex. 3 | 1.34 | 980 | 0.32 | 65 |
| Ex. 4 | 1.66 | 680 | 0.32 | 66 |
| Ex. 5 | 1.71 | 870 | 0.38 | 79 |
| Ex. 6 | 1.69 | 830 | 0.32 | 67 |
| Ex. 7 | 1.68 | 860 | 0.34 | 70 |
| Ex. 8 | 1.61 | 810 | 0.33 | 69 |
| Ex. 9 | 1.65 | 770 | 0.40 | 81 |
| Comp. Ex. 1 | 1.28 | 870 | 0.42 | 84 |
| Comp. Ex. 2 | 1.17 | 850 | 0.49 | 93 |
| Comp. Ex. 3 | Not available | 830 | 0.43 | 85 |
| Comp. Ex. 4 | 1.66 | Not detected | 0.48 | 90 |

When the thermal fixing temperature is increased to control the heat shrinkage, in the case of Comparative Example 2, the separator shows degradation of performance due to high resistance, unlike Example 2, and thus is not suitable for a separator for a lithium secondary battery. In the case of Comparative Example 2, it shows a resistance value approximately 32% higher than the resistance value of Example 2 obtained by a different manufacturing process but by using the same thermal fixing temperature, 132° C.

Test Example 2: Nail Penetration Test

At room temperature, each of the separators according to Examples 1-9 and Comparative Examples 1-4 was placed between sample loaders spaced apart from the bottom surface as shown in FIG. 7a, and was fixed to the sample loaders by using a jig. Next, a nail having a cone shape with a tip portion angle of 30° and a nail shank diameter of 1.0 mm was prepared, and the nail penetration tester was installed in such a manner that the nail was positioned in perpendicular to the separator and spaced apart from the separator by 50 mm. The nail penetration tester used herein was a custom-built tester so that it could operate under the above-mentioned condition. The nail was heated to a temperature of 370° C. and dropped vertically at a uniform rate of 1.0 m/min so that it might penetrate through the separator. As soon as the nail penetrated the separator by 5 mm, vertical dropping was stooped and the nail was fixed for 10 seconds. Then, the nail was elevated vertically and spaced apart from the separator, and then the separator loss diameter formed in the separator and the pore-blocked region after nail penetration were observed with an electron microscope to determine each length. The results are shown in the following Table 3.

TABLE 3

| | a (mm) | b (mm) | c (mm) | [Formula 1] b/a | [Formula 2] c/(b − a) |
|---|---|---|---|---|---|
| Ex. 1 | 1.0 | 1.78 | 1.10 | 1.78 | 1.41 |
| Ex. 2 | 1.0 | 1.73 | 1.08 | 1.73 | 1.48 |
| Ex. 3 | 1.0 | 1.79 | 1.08 | 1.79 | 1.37 |

TABLE 3-continued

| | a (mm) | b (mm) | c (mm) | [Formula 1] b/a | [Formula 2] c/(b − a) |
|---|---|---|---|---|---|
| Ex. 4 | 1.0 | 2.05 | 0.82 | 2.05 | 0.78 |
| Ex. 5 | 1.0 | 1.99 | 0.93 | 1.99 | 0.94 |
| Ex. 6 | 1.0 | 1.95 | 0.92 | 1.95 | 0.97 |
| Ex. 7 | 1.0 | 1.98 | 0.93 | 1.98 | 0.95 |
| Ex. 8 | 1.0 | 1.94 | 0.93 | 1.94 | 0.99 |
| Ex. 9 | 1.0 | 2.08 | 0.83 | 2.08 | 0.77 |
| Comp. Ex. 1 | 1.0 | 1.80 | 1.10 | 1.80 | 1.38 |
| Comp. Ex. 2 | 1.0 | 1.81 | 1.03 | 1.81 | 1.27 |
| Comp. Ex. 3 | 1.0 | 1.80 | 1.09 | 1.80 | 1.36 |
| Comp. Ex. 4 | 1.0 | 4.44 | 0.17 | 4.44 | 0.05 |

DESCRIPTION OF DRAWING NUMERALS

10: Nail
10a: Nail shank
10b: Nail tip
20: Separator
30: Sample loader
30a: Upper loader
30b: Lower loader
40: Bottom surface

What is claimed is:

1. A crosslinked polyolefin separator, comprising:
silane-crosslinked polyolefin, wherein the separator has gels with a longer side length of 50 μm or more in a number ranging from 0 to 3 per 1 m² of the separator, and the separator shows a standard deviation of absorbance ratio between a center of the separator and a side thereof ranging from 0.01 to 0.5,
wherein the absorbance ratio is determined by $I_{1090}/I_{2920}$ (×1000), $I_{1090}$ means an absorbance at 1090 cm$^{-1}$ where a functional group of —Si—OCH$_3$ derived from crosslinking is detected, and $I_{2920}$ means an absorbance at 2920 cm$^{-1}$ where a characteristic peak of polyolefin is expressed before crosslinking occurs.

2. The crosslinked polyolefin separator according to claim 1, wherein the standard deviation of absorbance ratio between the center of the separator and the side thereof is 0.25-0.40.

3. The crosslinked polyolefin separator according to claim 1, wherein the separator has a process capability index (Cp) of 1.3 or more, wherein the silane (Si) content in the separator is 700 ppm or more based on 100 parts by weight of the separator.

4. The crosslinked polyolefin separator according to claim 1, wherein the separator satisfies following [Formula 1] and [Formula 2] in a nail penetration test wherein a nail having a temperature of 250° C. or higher is dropped vertically:

$$b/a \leq 3.0 \quad \text{[Formula 1]}$$

$$c/(b-a) \geq 0.75 \quad \text{[Formula 2]}$$

wherein a represents a diameter of the nail used in the nail penetration test,
b represents a diameter of separator lost after nail penetration in the nail penetration test, and
c represents a length of a pore-blocked region after nail penetration.

5. The crosslinked polyolefin separator of claim 1, wherein the crosslinked polyolefin separator is manufactured by a method comprising:
(S1) preparing a polyolefin porous membrane;
(S2) applying a coating solution containing an initiator and alkoxy group-containing vinylsilane onto at least one surface of the porous membrane;
(S3) drying and thermally fixing the porous membrane coated with the coating solution; and
(S4) crosslinking the thermally fixed porous membrane in the presence of water.

* * * * *